United States Patent
Suitoh et al.

(10) Patent No.: US 10,937,134 B2
(45) Date of Patent: Mar. 2, 2021

(54) IMAGE PROCESSING APPARATUS, IMAGE CAPTURING SYSTEM, IMAGE PROCESSING METHOD, AND RECORDING MEDIUM

(71) Applicants: Hiroshi Suitoh, Kanagawa (JP); Kazuhiro Yoshida, Kanagawa (JP); Keiichi Kawaguchi, Kanagawa (JP); Takahiro Asai, Kanagawa (JP)

(72) Inventors: Hiroshi Suitoh, Kanagawa (JP); Kazuhiro Yoshida, Kanagawa (JP); Keiichi Kawaguchi, Kanagawa (JP); Takahiro Asai, Kanagawa (JP)

(73) Assignee: Ricoh Company, Ltd., Tokyo (JP)

(*) Notice: Subject to any disclaimer, the term of this patent is extended or adjusted under 35 U.S.C. 154(b) by 92 days.

(21) Appl. No.: 16/474,491

(22) PCT Filed: Dec. 28, 2017

(86) PCT No.: PCT/JP2017/047186
§ 371 (c)(1),
(2) Date: Jun. 27, 2019

(87) PCT Pub. No.: WO2018/124266
PCT Pub. Date: Jul. 5, 2018

(65) Prior Publication Data
US 2019/0347775 A1    Nov. 14, 2019

(30) Foreign Application Priority Data

Dec. 28, 2016 (JP) .............................. JP2016-256560
Sep. 29, 2017 (JP) .............................. JP2017-192011
Dec. 21, 2017 (JP) .............................. JP2017-245510

(51) Int. Cl.
*G06T 5/00* (2006.01)
*G06T 7/73* (2017.01)
(Continued)

(52) U.S. Cl.
CPC ............ *G06T 5/006* (2013.01); *G06T 3/0062* (2013.01); *G06T 5/50* (2013.01); *G06T 7/73* (2017.01);
(Continued)

(58) Field of Classification Search
CPC ......... G06T 5/006; G06T 7/73; G06T 3/0062; G06T 5/50; G06T 2207/20221; G06T 2207/30181; G06T 7/33; G06T 3/4038
(Continued)

(56) References Cited

U.S. PATENT DOCUMENTS

2016/0050369 A1   2/2016   Takenaka et al.
2016/0212336 A1   7/2016   Takenaka et al.
(Continued)

FOREIGN PATENT DOCUMENTS

| JP | 2000-215317 | 8/2000 |
|----|-------------|--------|
| JP | 2001-052146 | 2/2001 |

(Continued)

OTHER PUBLICATIONS

International Search Report and Written Opinion dated Mar. 23, 2018 in PCT/JP2017/047186 filed on Dec. 28, 2017.
(Continued)

*Primary Examiner* — Jerome Grant, II
(74) *Attorney, Agent, or Firm* — Oblon, McClelland, Maier & Neustadt, L.L.P.

(57) ABSTRACT

An image processing apparatus, an image capturing system, an image processing method, and a recording medium are provided. The image processing apparatus: obtains a first image in a first projection, and a second image in a second projection; transforms projection of at least a part of the first image corresponding to the second image, from the first projection to the second projection, to generate a third image in the second projection; extracts a plurality of feature
(Continued)

points, respectively, from the second image and the third image; determines a corresponding area in the third image that corresponds to the second image, based on the plurality of feature points respectively extracted from the second image and the third image; transforms projection of a plurality of points in the corresponding area of the third image, from the second projection to the first projection, to obtain location information indicating locations of the plurality of points in the first projection in the first image; and stores, in a memory, the location information indicating the locations of the plurality of points in the first projection in the first image, in association with the plurality of points in the second projection in the second image.

15 Claims, 53 Drawing Sheets

(51) Int. Cl.
    *G06T 3/00* (2006.01)
    *G06T 5/50* (2006.01)
(52) U.S. Cl.
    CPC .......... *G06T 2207/20221* (2013.01); *G06T 2207/30181* (2013.01)
(58) Field of Classification Search
    USPC .......................................... 382/284
    See application file for complete search history.

(56) References Cited

U.S. PATENT DOCUMENTS

| | | | |
|---|---|---|---|
| 2016/0269632 A1* | 9/2016 | Morioka | H04N 5/247 |
| 2017/0094169 A1 | 3/2017 | Yoshikawa et al. | |
| 2018/0181358 A1* | 6/2018 | Asai | G06T 11/60 |
| 2018/0182065 A1* | 6/2018 | Yoshida | H04N 5/23238 |
| 2018/0184001 A1* | 6/2018 | Yoshida | H04N 9/64 |
| 2018/0240223 A1* | 8/2018 | Yi | G06T 7/30 |
| 2018/0270417 A1* | 9/2018 | Suitoh | H04N 9/045 |
| 2019/0289203 A1* | 9/2019 | Suitoh | H04N 5/2258 |
| 2019/0289206 A1* | 9/2019 | Kawaguchi | H04N 5/23203 |
| 2019/0295216 A1* | 9/2019 | Suitoh | G06T 3/005 |
| 2019/0306420 A1* | 10/2019 | Okaki | H04N 5/23293 |
| 2019/0340737 A1* | 11/2019 | Kawaguchi | H04N 5/217 |
| 2019/0347766 A1* | 11/2019 | Kawaguchi | H04N 5/23238 |
| 2020/0236277 A1* | 7/2020 | Odamaki | H04N 9/045 |

FOREIGN PATENT DOCUMENTS

| | | |
|---|---|---|
| JP | 2002-262159 | 9/2002 |
| JP | 2012-078929 | 4/2012 |
| JP | 2012-164188 | 8/2012 |
| JP | 2012-178135 | 9/2012 |
| JP | 2013-156722 | 8/2013 |
| JP | 2016-048856 | 4/2016 |
| JP | 2016-096487 | 5/2016 |

OTHER PUBLICATIONS

Fadi Dornaika et al, "Image Registration for Foveated Omnidirectional Sensing" In:"ECCV 2016 conference",Jan. 1, 2002, Springer International Publishing, Cham 032548, XP055456994, ISSN:0302-9743 ISBN:978-3-642-33485-6 vol. 2353, pp. 606-620, DOI:10.1007/3-540-47979-1_41, abstract; figures 1,3,4,7 p. 609-p. 616 p. 607, paragraph 2.

Hamidreza Houshiar et al, "Panorama based point cloud reduction and registration", 2013 16th International Conference on Advanced Robotics(ICAR), IEEE, Nov. 25, 2013, pp. 1-8, XP032579333, DOI:10.1109/ICAR.2013.6766587[retrieved on Mar. 12, 2014] abstract; figure 2 "Automatic Registration"; p. 5.

Richard Szeliski, "Image Alignment and Stitching: A Tutorial", Foundations and Trends in Computer Graphics and Vision, vol. 2, No. 1, Jan. 1, 2006, pp. 1-104, XP055400792,US ISSN:1572-2740, DOI:10.1561/0600000009 the whole document.

Barbara Zitova B et al, "Image Registration Methods: A Survey", Image and Vision Computing, Elsevier, Guildford, GB, vol. 21, No. 11, Oct. 1, 2003, pp. 977-1000, XP002522120, ISSN:0262-8856, DOI:10.1016/50262-8856(03)00137-9[retrieved on Aug. 27, 2003] the whole document.

Bo-Sung Kim et al, "Estimating deformation factors of planar patterns in spherical panoramic images", Multimedia Systems, ACM, New York, NY, US, vol. 23, No. 5, Apr. 18, 2016, pp. 607-625, XP036327863, ISSN:0942-4962, DOI:10.1007/S00530-016-0513-X[retrieved on Apr. 18, 2016] the whole document.

* cited by examiner

HEMISPHERICAL IMAGE (FRONT)

HEMISPHERICAL IMAGE (BACK)

CAPTURED IMAGE (EQUIRECTANGULAR PROJECTION IMAGE EC)

FIG. 4A
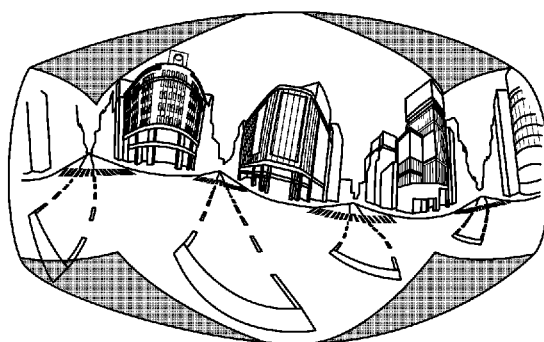
EQUIRECTANGULAR PROJECTION IMAGE EC
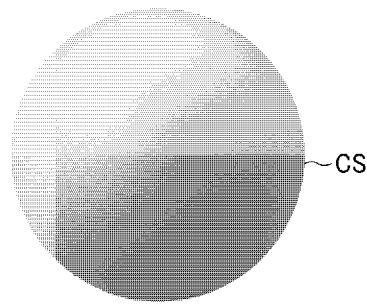

SPHERICAL IMAGE CE

PREDETERMINED-AREA IMAGE Q

FIG. 15A

| LINKING INFORMATION | IP ADDRESS | DEVICE NAME |
|---|---|---|
| MAIN | 1.2.3.4 | k1-camera1 |
| SUB 1 | 1.2.3.5 | theta-camera1 |
| – | 1.2.3.6 | theta-camera2 |
| ⋮ | ⋮ | ⋮ |

FIG. 17

| EQUIRECTANGULAR PROJECTION IMAGE INFORMATION | IMAGE ID | | ./IMAGE001.JPG |
|---|---|---|---|
| | ATTRIBUTE DATA | POSITIONING CORRECTION (Pitch, Yaw, Roll) | (−2.8, −2.1, 0) |
| PALANAR IMAGE INFORMATION | IMAGE ID | | ./IMAGE111.JPG |
| | ATTRIBUTE DATA | 35 mm EQUIVALENT FOCAL LENGTH | 28 |
| | AREA DIVISION NUMBER INFORMATION | HORIZONTAL (LONGITUDE) DIVISION NUMBER | 30 |
| | | VERTICAL (LATITUDE) DIVISION NUMBER | 20 |
| SUPERIMPOSED DISPLAY INFORMATION | COORDINATE OF GRID IN GRID AREA (LOCATION PARAMETER) | | $(LO'_{00,00}, LA'_{00,00}), (LO'_{01,00}, LA'_{01,00}), \ldots,$ $(LO_{30,20}, LA'_{30,20})$ |
| | CORRECTION VALUE OF BRIGHTNESS AND COLOR (CORRECTION PARAMETER) | | $(R_{00,00}, G_{00,00}, B_{00,00}), (R_{01,00}, G_{01,00}, B_{01,00}),$ $\ldots, (R_{30,20}, G_{30,20}, B_{30,20})$ |
| METADATA GENERATION INFORMATION | VERSION INFORMATION | | 0.1.1 |

PLANAR IMAGE P

PERIPHERAL AREA IMAGE PI

PERIPHERAL AREA IMAGE PI

PERIPHERAL AREA IMAGE PI

PLANAR IMAGE P

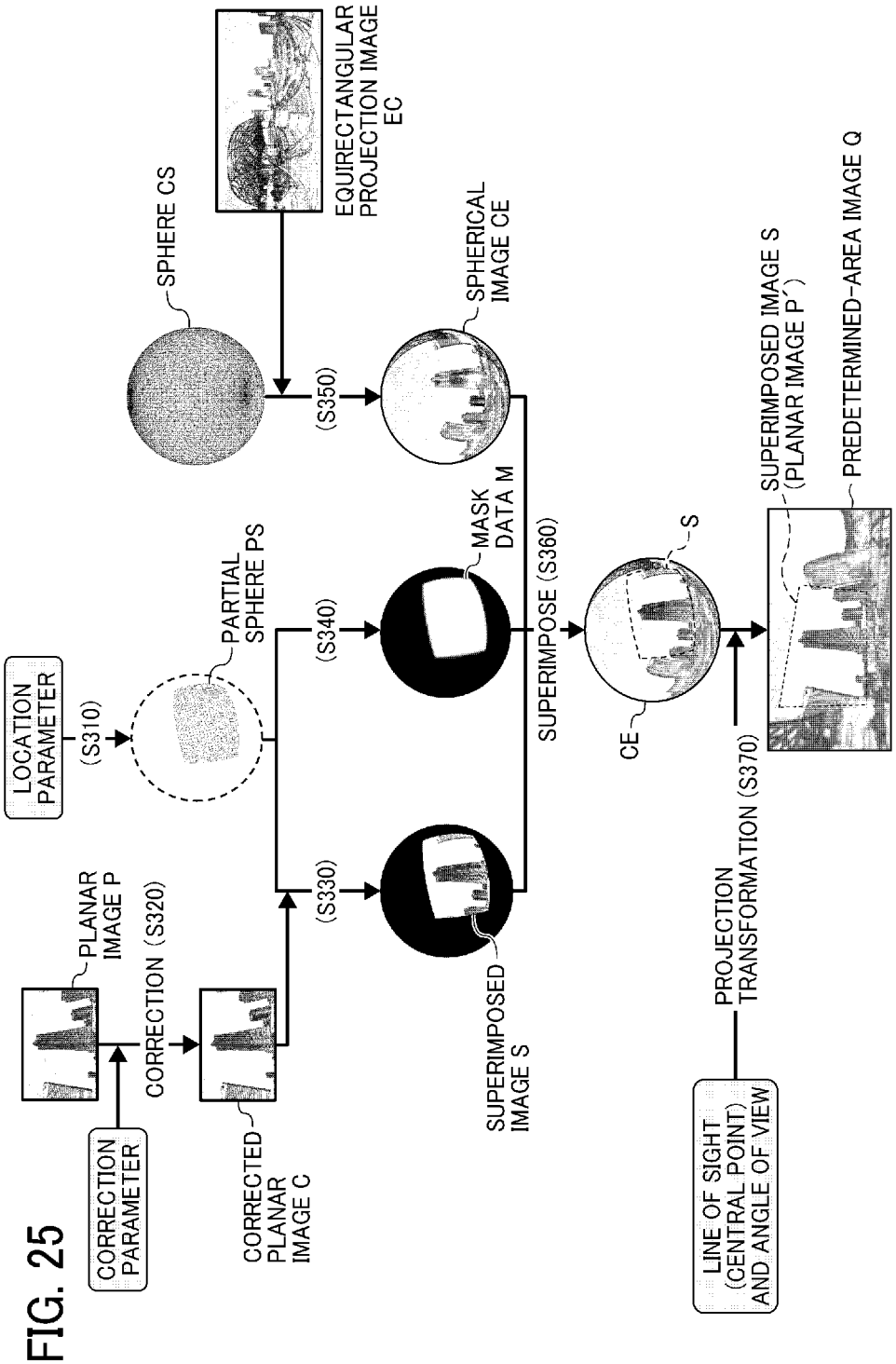

SPHERICAL IMAGE CE

SPHERICAL IMAGE CE

IMAGE PROCESSING APPARATUS, IMAGE CAPTURING SYSTEM, IMAGE PROCESSING METHOD, AND RECORDING MEDIUM

TECHNICAL FIELD

The present invention relates to an image processing apparatus, an image capturing system, an image processing method, and a recording medium.

BACKGROUND ART

The wide-angle image, taken with a wide-angle lens, is useful in capturing such as landscape, as the image tends to cover large areas. For example, there is an image capturing system, which captures a wide-angle image of a target object and its surroundings, and an enlarged image of the target object. The wide-angle image is combined with the enlarged image such that, even when a part of the wide-angle image showing the target object is enlarged, that part embedded with the enlarged image is displayed in high resolution (See PTL1).

On the other hand, a digital camera that captures two hemispherical images from which a 360-degree, spherical image is generated, has been proposed (See PTL 2). Such digital camera generates an equirectangular projection image based on two hemispherical images, and transmits the equirectangular projection image to a communication terminal, such as a smart phone, for display to a user.

CITATION LIST

Patent Literature

PTL 1: Japanese Unexamined Patent Application Publication No. 2016-96487
PTL 2: Japanese Unexamined Patent Application Publication No. 2017-178135

SUMMARY OF INVENTION

Technical Problem

The inventors of the present invention have realized that, the spherical image of a target object and its surroundings, can be combined with such as a planar image of the target object, in a similar manner as described above. However, if the spherical image is to be displayed with the planar image of the target object, positions of these images may be shifted from each other, as these images are taken in different projections.

Solution to Problem

Example embodiments of the present invention include an image processing apparatus, which: obtains a first image in a first projection, and a second image in a second projection; transforms projection of at least a part of the first image corresponding to the second image, from the first projection to the second projection, to generate a third image in the second projection; extracts a plurality of feature points, respectively, from the second image and the third image; determines a corresponding area in the third image that corresponds to the second image, based on the plurality of feature points respectively extracted from the second image and the third image; transforms projection of a plurality of points in the corresponding area of the third image, from the second projection to the first projection, to obtain location information indicating locations of the plurality of points in the first projection in the first image; and stores, in a memory, the location information indicating the locations of the plurality of points in the first projection in the first image, in association with the plurality of points in the second projection in the second image.

Example embodiments of the present invention include an image capturing system including the image processing apparatus, an image processing method, and a recording medium.

Advantageous Effects of Invention

According to one or more embodiments of the present invention, even when one image is superimposed on other image that are different in projections, the shift in position between these images can be suppressed.

BRIEF DESCRIPTION OF DRAWINGS

The accompanying drawings are intended to depict example embodiments of the present invention and should not be interpreted to limit the scope thereof. The accompanying drawings are not to be considered as drawn to scale unless explicitly noted. Also, identical or similar reference numerals designate identical or similar components throughout the several views.

FIG. 4A and FIG. 4B are views respectively illustrating the image in equirectangular projection covering a surface of a sphere, and a spherical image, according to an embodiment.

FIGS. 15A and 15B are conceptual diagrams respectively illustrating a linked image capturing device management table, and a linked image capturing device configuration screen, according to the first embodiment.

FIG. 25 is a conceptual diagram illustrating operation of superimposing images, with images being processed or generated, according to the first embodiment.

DESCRIPTION OF EMBODIMENTS

Figure 1A:
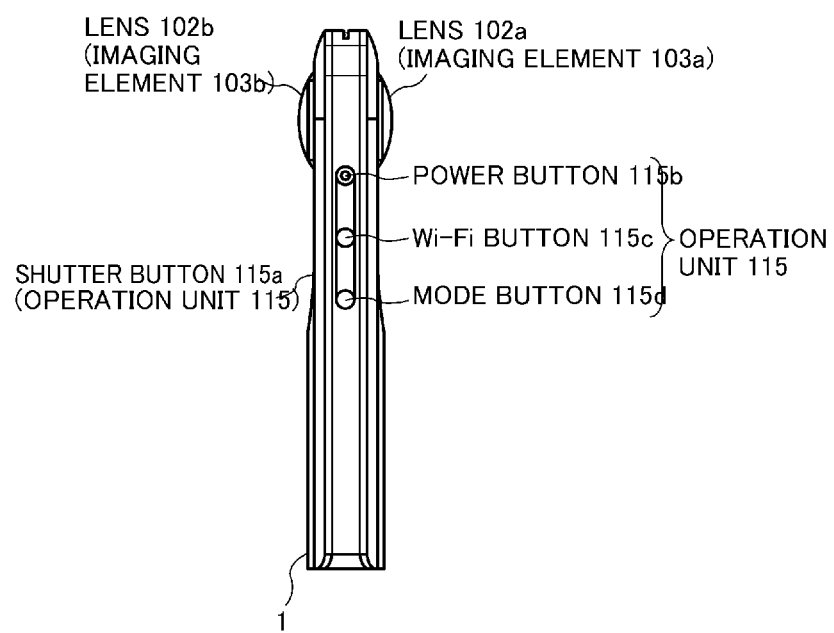
FIGS. 1A, 1B, 1C, and 1D (FIG. 1) are a left side view, a rear view, a plan view, and a bottom side view of a special image capturing device, according to an embodiment.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

The terminology used herein is for the purpose of describing particular embodiments only and is not intended to be limiting of the present invention. As used herein, the singular forms "a", "an" and "the" are intended to include the plural forms as well, unless the context clearly indicates otherwise.

In this disclosure, a first image is an image superimposed with a second image, and a second image is an image to be superimposed on the first image. For example, the first image is an image covering an area larger than that of the second image. In another example, the first image and the second image are images expressed in different projections. In another example, the second image is an image with image quality higher than that of the first image, for example, in terms of image resolution. Examples of the first image include a spherical image, an equirectangular projection image, and a low-definition image. Examples of the second image include a planar image, a perspective projection image, and a high-definition image.

Further, in this disclosure, the spherical image does not have to be the full-view spherical image. For example, the spherical image may be the wide-angle view image having an angle of about 180 to 360 degrees in the horizontal direction. As described below, it is desirable that the spherical image is image data having at least a part that is not entirely displayed in the predetermined area T.

Referring to the drawings, embodiments of the present invention are described below.

First, referring to FIGS. 1 to 7, operation of generating a spherical image is described according to an embodiment.

First, referring to FIGS. 1A to 1D, an external view of a special-purpose (special) image capturing device 1, is described according to the embodiment. The special image capturing device 1 is a digital camera for capturing images from which a 360-degree spherical image is generated. FIGS. 1A to 1D are respectively a left side view, a rear view, a plan view, and a bottom view of the special image capturing device 1.

Figure 1B:
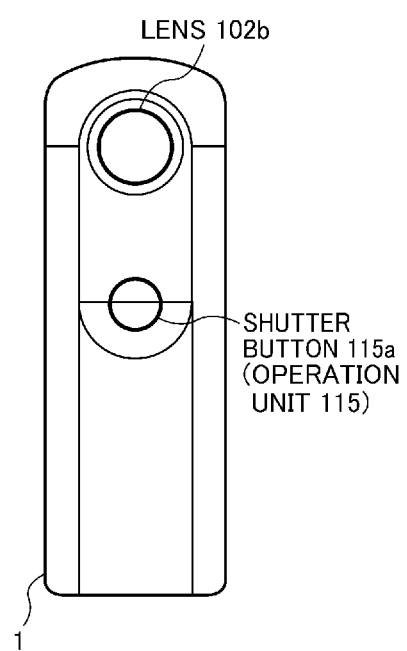
Figure 1C:
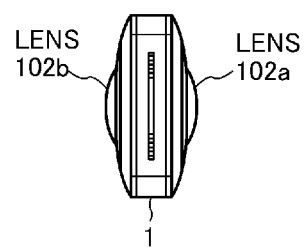

As illustrated in FIGS. 1A to 1D, the special image capturing device 1 has an upper part, which is provided with a fish-eye lens 102a on a front side (anterior side) thereof, and a fish-eye lens 102b on a back side (rear side) thereof. The special image capturing device 1 includes imaging elements (imaging sensors) 103a and 103b in its inside. The imaging elements 103a and 103b respectively capture images of an object or surroundings via the lenses 102a and 102b, to each obtain a hemispherical image (the image with an angle of view of 180 degrees or greater). As illustrated in FIG. 1B, the special image capturing device 1 further includes a shutter button 115a on a rear side of the special image capturing device 1, which is opposite of the front side of the special image capturing device 1. As illustrated in FIG. 1A, the left side of the special image capturing device 1 is provided with a power button 115b, a Wireless Fidelity (Wi-Fi) button 115c, and an image capturing mode button 115d. Any one of the power button 115b and the Wi-Fi button 115c switches between ON and OFF, according to selection (pressing) by the user. The image capturing mode button 115d switches between a still-image capturing mode and a moving image capturing mode, according to selection (pressing) by the user. The shutter button 115a, power button 115b, Wi-Fi button 115c, and image capturing mode button 115d are a part of an operation unit 115. The operation unit 115 is any section that receives a user instruction, and is not limited to the above-described buttons or switches.

Figure 1D:
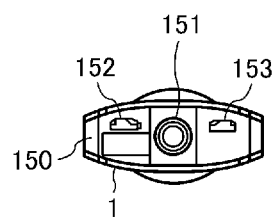

As illustrated in FIG. 1D, the special image capturing device 1 is provided with a tripod mount hole 151 at a center of its bottom face 150. The tripod mount hole 151 receives a screw of a tripod, when the special image capturing device 1 is mounted on the tripod. In this embodiment, the tripod mount hole 151 is where the generic image capturing device 3 is attached via an adapter 9, described later referring to FIG. 9. The bottom face 150 of the special image capturing device 1 further includes a Micro Universal Serial Bus (Micro USB) terminal 152, on its left side. The bottom face 150 further includes a High-Definition Multimedia Interface (HDMI, Registered Trademark) terminal 153, on its right side.

Figure 2:
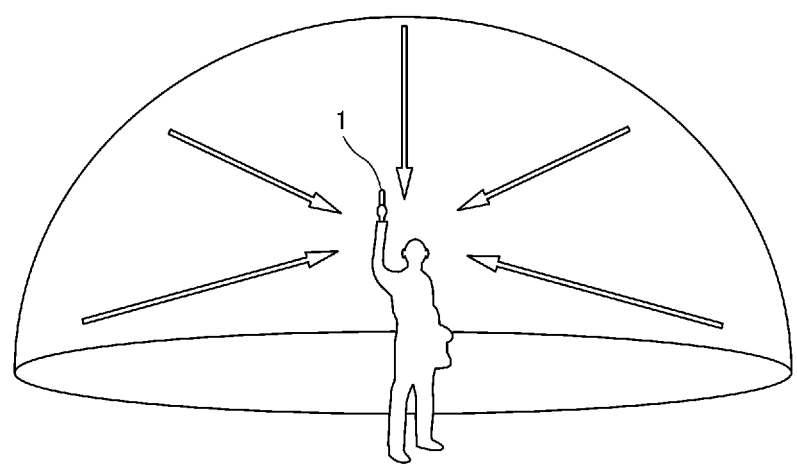
FIG. 2 is an illustration for explaining how a user uses the image capturing device, according to an embodiment.

Next, referring to FIG. 2, a description is given of a situation where the special image capturing device 1 is used. FIG. 2 illustrates an example of how the user uses the special image capturing device 1. As illustrated in FIG. 2, for example, the special image capturing device 1 is used for capturing objects surrounding the user who is holding the special image capturing device 1 in his or her hand. The imaging elements 103a and 103b illustrated in FIGS. 1A to 1D capture the objects surrounding the user to obtain two hemispherical images.

Figure 3A:
FIGS. 3A, 3B, and 3C are views illustrating a front side of a hemispherical image, a back side of the hemispherical image, and an image in equirectangular projection, respectively, captured by the image capturing device, according to an embodiment.
Figure 3B:
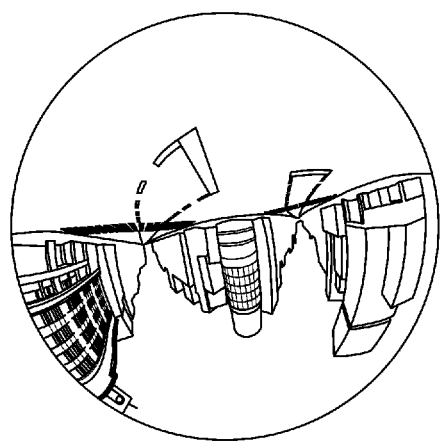
Figure 3C:
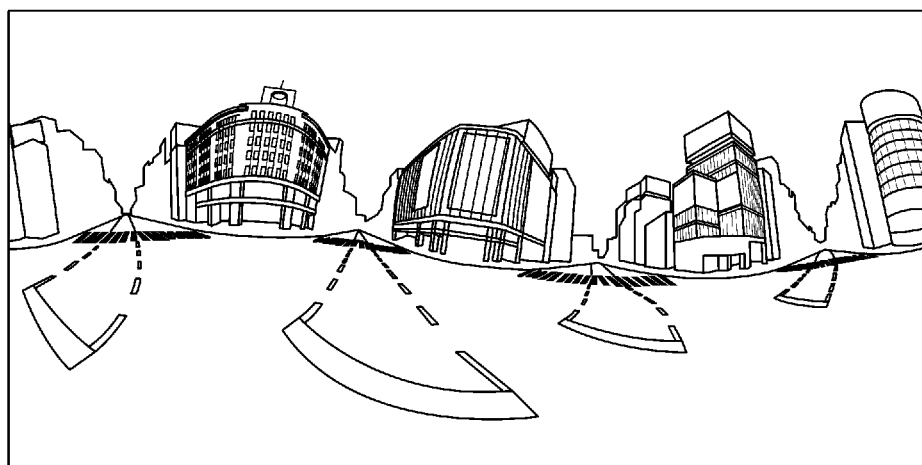
Figure 4B:
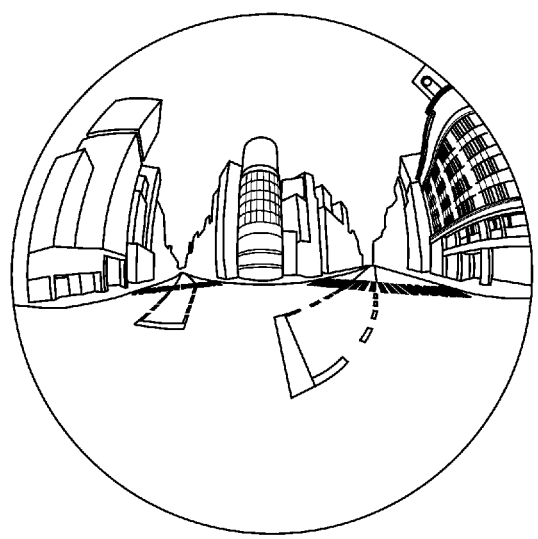

Next, referring to FIGS. 3A to 3C and FIGS. 4A and 4B, a description is given of an overview of an operation of generating an equirectangular projection image EC and a spherical image CE from the images captured by the special image capturing device 1. FIG. 3A is a view illustrating a hemispherical image (front side) captured by the special image capturing device 1. FIG. 3B is a view illustrating a hemispherical image (back side) captured by the special image capturing device 1. FIG. 3C is a view illustrating an image in equirectangular projection, which is referred to as an "equirectangular projection image" (or equidistant cylindrical projection image) EC. FIG. 4A is a conceptual diagram illustrating an example of how the equirectangular projection image maps to a surface of a sphere. FIG. 4B is a view illustrating the spherical image.

As illustrated in FIG. 3A, an image captured by the imaging element 103a is a curved hemispherical image (front side) taken through the fish-eye lens 102a. Also, as illustrated in FIG. 3B, an image captured by the imaging element 103b is a curved hemispherical image (back side) taken through the fish-eye lens 102b. The hemispherical image (front side) and the hemispherical image (back side), which are reversed by 180-degree from each other, are combined by the special image capturing device 1. This results in generation of the equirectangular projection image EC as illustrated in FIG. 3C.

The equirectangular projection image is mapped on the sphere surface using Open Graphics Library for Embedded Systems (OpenGL ES) as illustrated in FIG. 4A. This results in generation of the spherical image CE as illustrated in FIG. 4B. In other words, the spherical image CE is represented as the equirectangular projection image EC, which corresponds to a surface facing a center of the sphere CS. It should be noted that OpenGL ES is a graphic library used for visualizing two-dimensional (2D) and three-dimensional (3D) data. The spherical image CE is either a still image or a moving image.

Since the spherical image CE is an image attached to the sphere surface, as illustrated in FIG. 4B, a part of the image may look distorted when viewed from the user, providing a feeling of strangeness. To resolve this strange feeling, an image of a predetermined area, which is a part of the spherical image CE, is displayed as a flat image having fewer curves. The predetermined area is, for example, a part of the spherical image CE that is viewable by the user. In this disclosure, the image of the predetermined area is referred to as a "predetermined-area image" Q. Hereinafter, a description is given of displaying the predetermined-area image Q with reference to FIG. 5 and FIGS. 6A and 6B.

Figure 5:
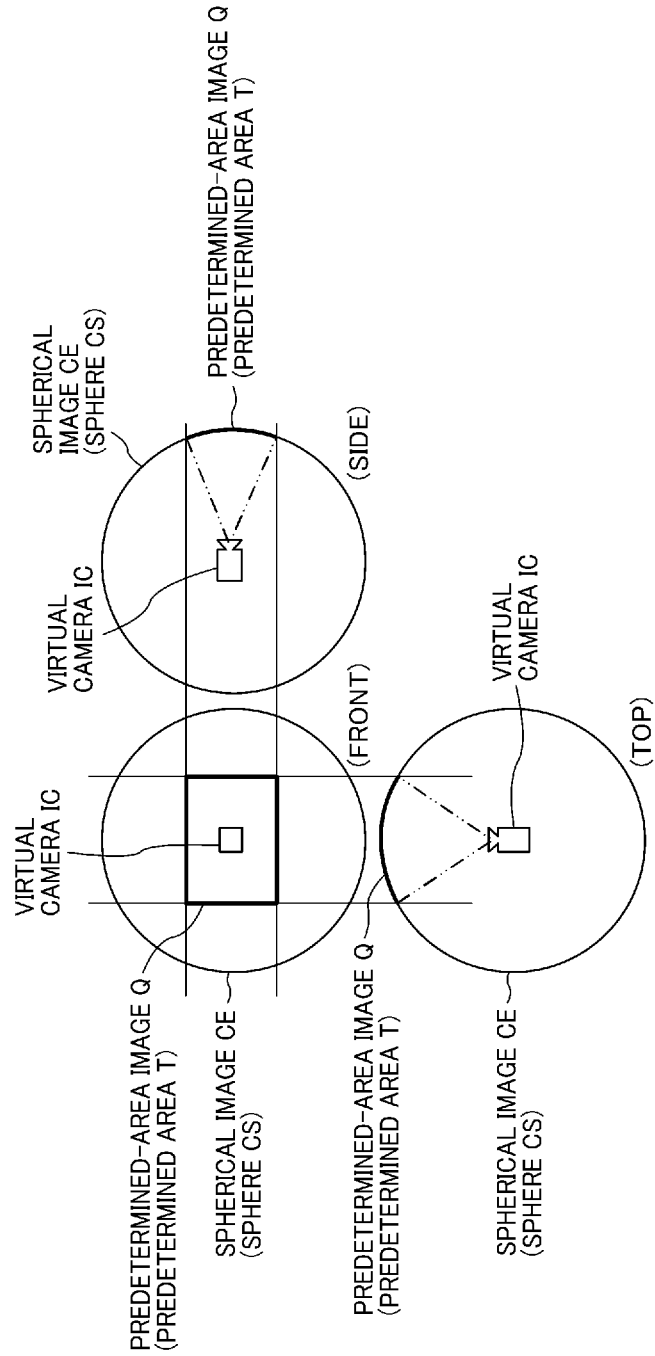
FIG. 5 is a view illustrating positions of a virtual camera and a predetermined area in a case in which the spherical image is represented as a three-dimensional solid sphere according to an embodiment.
Figure 6A:
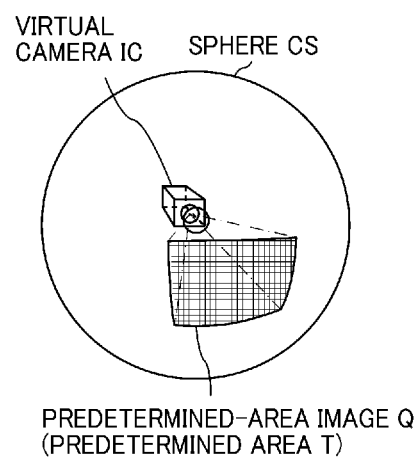
FIGS. 6A and 6B are respectively a perspective view of FIG. 5, and a view illustrating an image of the predetermined area on a display, according to an embodiment.
Figure 6B:
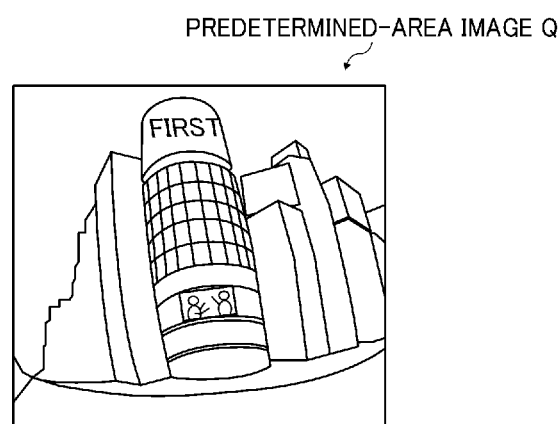

FIG. 5 is a view illustrating positions of a virtual camera IC and a predetermined area T in a case in which the spherical image is represented as a surface area of a three-dimensional solid sphere. The virtual camera IC corresponds to a position of a point of view (viewpoint) of a user who is viewing the spherical image CE represented as a surface area of the three-dimensional solid sphere CS. FIG. 6A is a perspective view of the spherical image CE illustrated in FIG. 5. FIG. 6B is a view illustrating the predetermined-area image Q when displayed on a display. In FIG. 6A, the spherical image CE illustrated in FIG. 4B is represented as a surface area of the three-dimensional solid sphere CS. Assuming that the spherical image CE is a surface area of the solid sphere CS, the virtual camera IC is inside of the spherical image CE as illustrated in FIG. 5. The predetermined area T in the spherical image CE is an imaging area of the virtual camera IC. Specifically, the predetermined area T is specified by predetermined-area information indicating an imaging direction and an angle of view of the virtual camera IC in a three-dimensional virtual space containing the spherical image CE.

The predetermined-area image Q, which is an image of the predetermined area T illustrated in FIG. 6A, is displayed on a display as an image of an imaging area of the virtual camera IC, as illustrated in FIG. 6B. FIG. 6B illustrates the predetermined-area image Q represented by the predetermined-area information that is set by default. The following explains the position of the virtual camera IC, using an imaging direction (ea, aa) and an angle of view α of the virtual camera IC.

Figure 7:
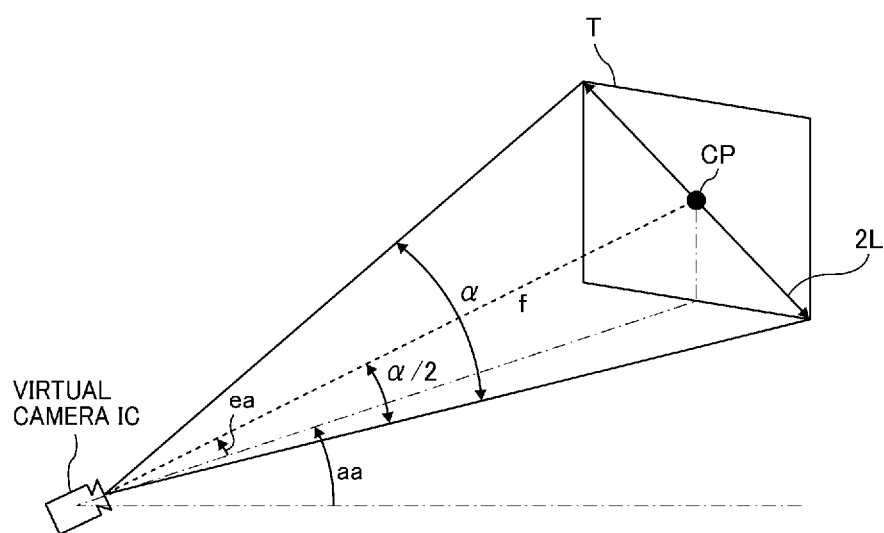
FIG. 7 is a view illustrating a relation between predetermined-area information and a predetermined-area image according to an embodiment.

Referring to FIG. 7, a relation between the predetermined-area information and the image of the predetermined area T is described according to the embodiment. FIG. 7 is a view illustrating a relation between the predetermined-area information and the image of the predetermined area T. As illustrated in FIG. 7, "ea" denotes an elevation angle, "aa" denotes an azimuth angle, and "α" denotes an angle of view, respectively, of the virtual camera IC. The position of the virtual camera IC is adjusted, such that the point of gaze of the virtual camera IC, indicated by the imaging direction (ea, aa), matches the central point CP of the predetermined area T as the imaging area of the virtual camera IC. The predetermined-area image Q is an image of the predetermined area T, in the spherical image CE. "f" denotes a distance from the virtual camera IC to the central point CP of the predetermined area T. "L" denotes a distance between the central point CP and a given vertex of the predetermined area T (2L is a diagonal line). In FIG. 7, a trigonometric function equation generally expressed by the following Equation 1 is satisfied.

$$L/f = \tan(\alpha/2) \quad \text{(Equation 1)}$$

First Embodiment

Referring to FIGS. 8 to 30D, the image capturing system according to a first embodiment of the present invention is described.

<Overview of Image Capturing System>

Figure 8:
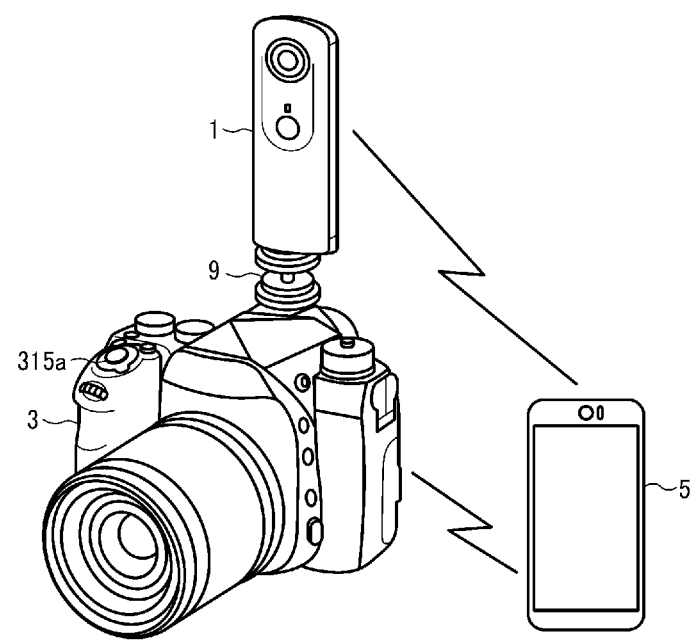
FIG. 8 is a schematic view illustrating an image capturing system according to a first embodiment.

First, referring to FIG. 8, an overview of the image capturing system is described according to the first embodiment. FIG. 8 is a schematic diagram illustrating a configuration of the image capturing system according to the embodiment.

As illustrated in FIG. 8, the image capturing system includes the special image capturing device 1, a general-purpose (generic) capturing device 3, a smart phone 5, and an adapter 9. The special image capturing device 1 is connected to the generic image capturing device 3 via the adapter 9.

The special image capturing device 1 is a special digital camera, which captures an image of an object or surroundings such as scenery to obtain two hemispherical images, from which a spherical (panoramic) image is generated, as described above referring to FIGS. 1 to 7.

The generic image capturing device 3 is a digital single-lens reflex camera, however, it may be implemented as a compact digital camera. The generic image capturing device 3 is provided with a shutter button 315a, which is a part of an operation unit 315 described below.

The smart phone 5 is wirelessly communicable with the special image capturing device 1 and the generic image capturing device 3 using near-distance wireless communication, such as Wi-Fi, Bluetooth (Registered Trademark), and Near Field Communication (NFC). The smart phone 5 is capable of displaying the images obtained respectively from the special image capturing device 1 and the generic image capturing device 3, on a display 517 provided for the smart phone 5 as described below.

The smart phone 5 may communicate with the special image capturing device 1 and the generic image capturing device 3, without using the near-distance wireless communication, but using wired communication such as a cable. The smart phone 5 is an example of an image processing apparatus capable of processing images being captured. Other examples of the image processing apparatus include, but not limited to, a tablet personal computer (PC), a note PC, and a desktop PC. The smart phone 5 may operate as a communication terminal described below.

Figure 9:
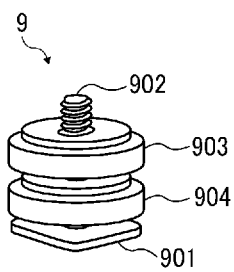
FIG. 9 is a perspective view illustrating an adapter, according to the first embodiment.

FIG. 9 is a perspective view illustrating the adapter 9 according to the embodiment. As illustrated in FIG. 9, the adapter 9 includes a shoe adapter 901, a bolt 902, an upper adjuster 903, and a lower adjuster 904. The shoe adapter 901 is attached to an accessory shoe of the generic image capturing device 3 as it slides. The bolt 902 is provided at a center of the shoe adapter 901, which is to be screwed into the tripod mount hole 151 of the special image capturing device 1. The bolt 902 is provided with the upper adjuster 903 and the lower adjuster 904, each of which is rotatable around the central axis of the bolt 902. The upper adjuster 903 secures the object attached with the bolt 902 (such as the special image capturing device 1). The lower adjuster 904 secures the object attached with the shoe adapter 901 (such as the generic image capturing device 3).

Figure 10:
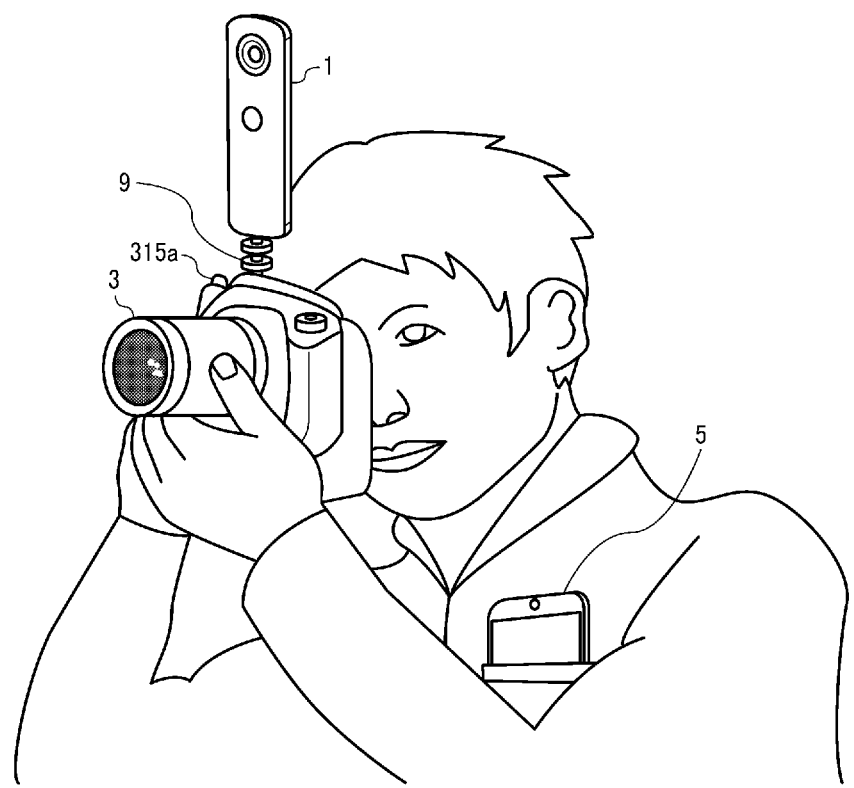
FIG. 10 illustrates how a user uses the image capturing system, according to the first embodiment.

FIG. 10 illustrates how a user uses the image capturing device, according to the embodiment. As illustrated in FIG. 10, the user puts his or her smart phone 5 into his or her pocket. The user captures an image of an object using the generic image capturing device 3 to which the special image capturing device 1 is attached by the adapter 9. While the smart phone 5 is placed in the pocket of the user's shirt, the smart phone 5 may be placed in any area as long as it is wirelessly communicable with the special image capturing device 1 and the generic image capturing device 3.

Hardware Configuration

Figure 11:
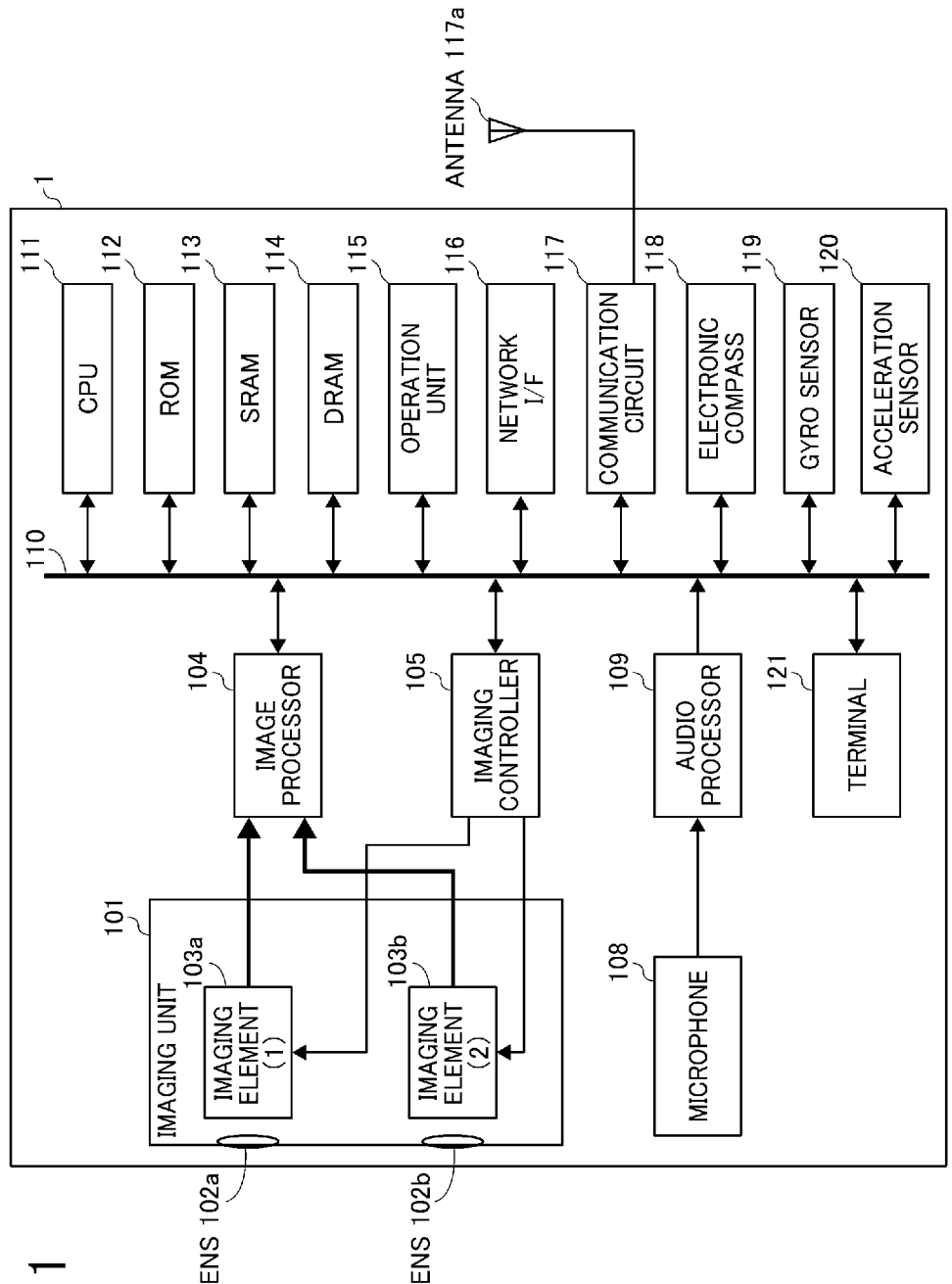
FIG. 11 is a schematic block diagram illustrating a hardware configuration of a special-purpose image capturing device according to the first embodiment.
Figure 12:
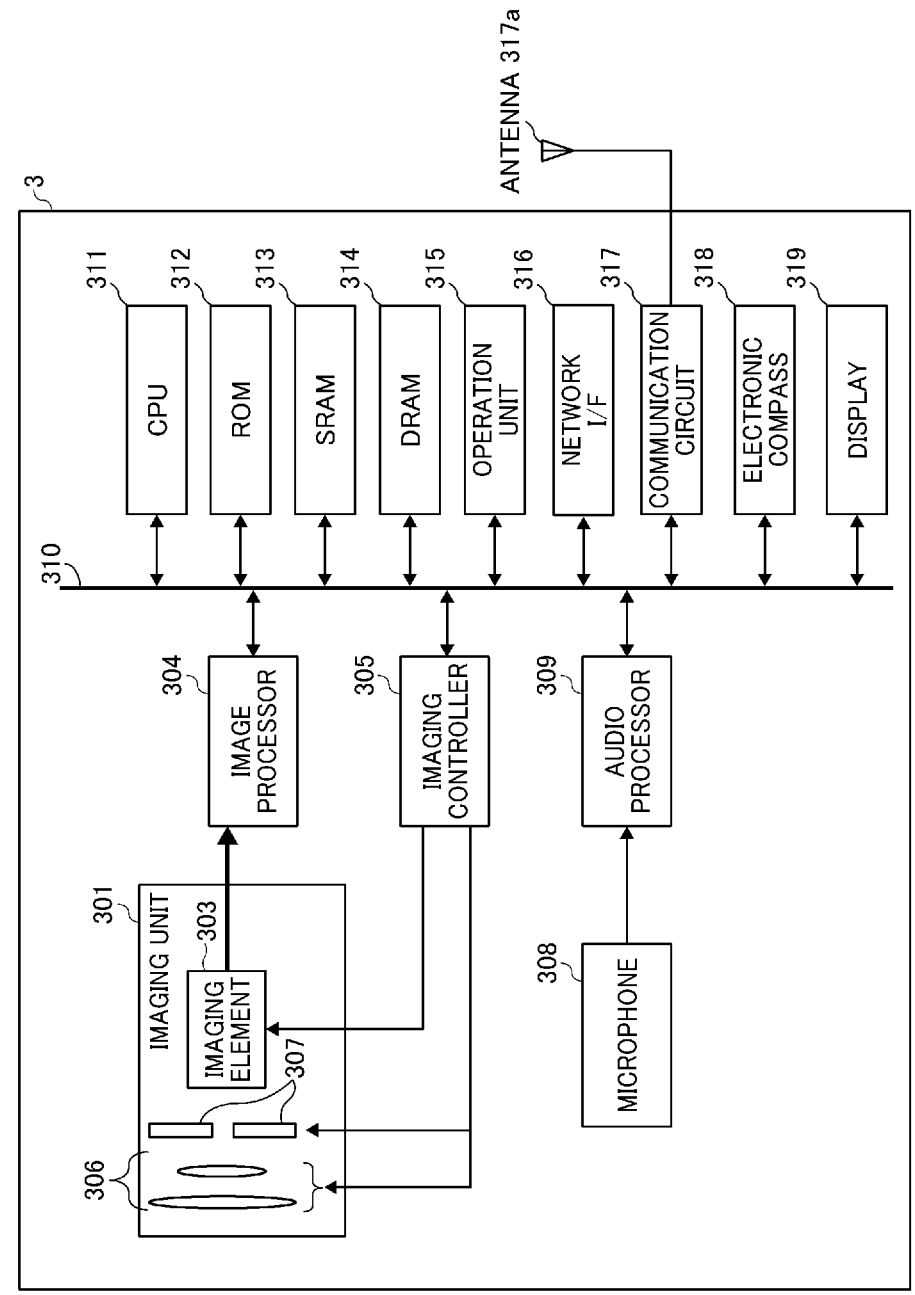
FIG. 12 is a schematic block diagram illustrating a hardware configuration of a general-purpose image capturing device according to the first embodiment.
Figure 13:
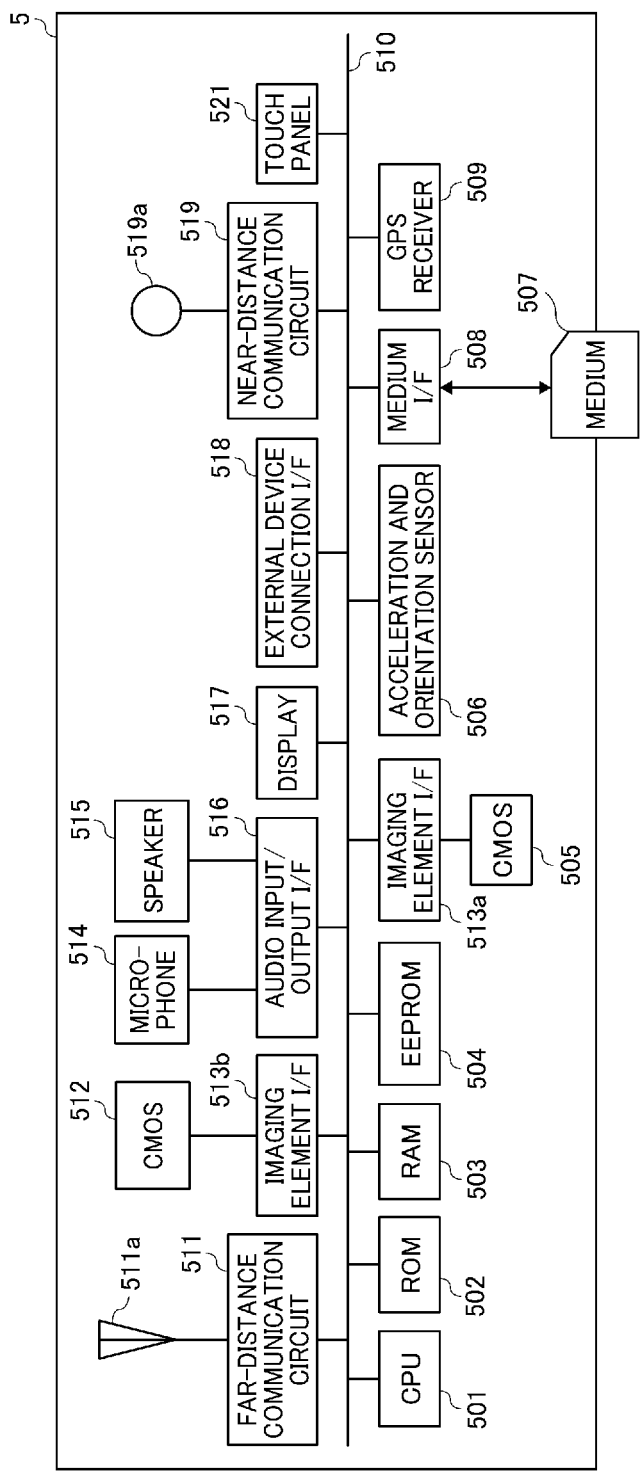
FIG. 13 is a schematic block diagram illustrating a hardware configuration of a smart phone, according to the first embodiment.

Next, referring to FIGS. 11 to 13, hardware configurations of the special image capturing device 1, generic image capturing device 3, and smart phone 5 are described according to the embodiment.

<Hardware Configuration of Special Image Capturing Device>

First, referring to FIG. 11, a hardware configuration of the special image capturing device 1 is described according to the embodiment. FIG. 11 illustrates the hardware configuration of the special image capturing device 1. The following describes a case in which the special image capturing device 1 is a spherical (omnidirectional) image capturing device having two imaging elements. However, the special image capturing device 1 may include any suitable number of imaging elements, providing that it includes at least two imaging elements. In addition, the special image capturing device 1 is not necessarily an image capturing device dedicated to omnidirectional image capturing. Alternatively, an external omnidirectional image capturing unit may be attached to a general-purpose digital camera or a smartphone to implement an image capturing device having substantially the same function as that of the special image capturing device 1.

As illustrated in FIG. 11, the special image capturing device 1 includes an imaging unit 101, an image processor 104, an imaging controller 105, a microphone 108, an audio processor 109, a central processing unit (CPU) 111, a read only memory (ROM) 112, a static random access memory (SRAM) 113, a dynamic random access memory (DRAM) 114, the operation unit 115, a network interface (I/F) 116, a communication circuit 117, an antenna 117a, an electronic compass 118, a gyro sensor 119, an acceleration sensor 120, and a Micro USB terminal 121.

The imaging unit 101 includes two wide-angle lenses (so-called fish-eye lenses) 102a and 102b, each having an angle of view of equal to or greater than 180 degrees so as to form a hemispherical image. The imaging unit 101 further includes the two imaging elements 103a and 103b corresponding to the wide-angle lenses 102a and 102b respectively. The imaging elements 103a and 103b each includes an imaging sensor such as a complementary metal oxide semiconductor (CMOS) sensor and a charge-coupled device (CCD) sensor, a timing generation circuit, and a group of registers. The imaging sensor converts an optical image formed by the wide-angle lenses 102a and 102b into electric signals to output image data. The timing generation circuit generates horizontal or vertical synchronization signals, pixel clocks and the like for the imaging sensor. Various commands, parameters and the like for operations of the imaging elements 103a and 103b are set in the group of registers.

Each of the imaging elements 103a and 103b of the imaging unit 101 is connected to the image processor 104 via a parallel I/F bus. In addition, each of the imaging elements 103a and 103b of the imaging unit 101 is connected to the imaging controller 105 via a serial I/F bus such as an I2C bus. The image processor 104, the imaging controller 105, and the audio processor 109 are each connected to the CPU 111 via a bus 110. Furthermore, the ROM 112, the SRAM 113, the DRAM 114, the operation unit 115, the network I/F 116, the communication circuit 117, the electronic compass 118, and the terminal 121 are also connected to the bus 110.

The image processor 104 acquires image data from each of the imaging elements 103a and 103b via the parallel I/F bus and performs predetermined processing on each image data. Thereafter, the image processor 104 combines these image data to generate data of the equirectangular projection image as illustrated in FIG. 3C.

The imaging controller 105 usually functions as a master device while the imaging elements 103a and 103b each usually functions as a slave device. The imaging controller 105 sets commands and the like in the group of registers of the imaging elements 103a and 103b via the serial I/F bus such as the I2C bus. The imaging controller 105 receives various commands from the CPU 111. Further, the imaging controller 105 acquires status data and the like of the group of registers of the imaging elements 103a and 103b via the serial I/F bus such as the I2C bus. The imaging controller 105 sends the acquired status data and the like to the CPU 111.

The imaging controller 105 instructs the imaging elements 103a and 103b to output the image data at a time when the shutter button 115a of the operation unit 115 is pressed. In some cases, the special image capturing device 1 is capable of displaying a preview image on a display (e.g., the display of the smart phone 5) or displaying a moving image (movie). In case of displaying movie, the image data are continuously output from the imaging elements 103a and 103b at a predetermined frame rate (frames per minute).

Furthermore, the imaging controller 105 operates in cooperation with the CPU 111 to synchronize the time when the imaging element 103a outputs image data and the time when the imaging element 103b outputs the image data. It should be noted that, although the special image capturing device 1 does not include a display in this embodiment, the special image capturing device 1 may include the display.

The microphone 108 converts sounds to audio data (signal). The audio processor 109 acquires the audio data output from the microphone 108 via an I/F bus and performs predetermined processing on the audio data.

The CPU 111 controls entire operation of the special image capturing device 1, for example, by performing predetermined processing. The ROM 112 stores various programs for execution by the CPU 111. The SRAM 113 and the DRAM 114 each operates as a work memory to store programs loaded from the ROM 112 for execution by the CPU 111 or data in current processing. More specifically, in one example, the DRAM 114 stores image data currently processed by the image processor 104 and data of the equirectangular projection image on which processing has been performed.

The operation unit 115 collectively refers to various operation keys, such as the shutter button 115a. In addition to the hardware keys, the operation unit 115 may also include a touch panel. The user operates the operation unit 115 to input various image capturing (photographing) modes or image capturing (photographing) conditions.

The network I/F 116 collectively refers to an interface circuit such as a USB I/F that allows the special image capturing device 1 to communicate data with an external medium such as an SD card or an external personal computer. The network I/F 116 supports at least one of wired and wireless communications. The data of the equirectangular projection image, which is stored in the DRAM 114, is stored in the external medium via the network I/F 116 or transmitted to the external device such as the smart phone 5 via the network I/F 116, at any desired time.

The communication circuit 117 communicates data with the external device such as the smart phone 5 via the antenna 117a of the special image capturing device 1 by near-distance wireless communication such as Wi-Fi, NFC, and Bluetooth. The communication circuit 117 is also capable of transmitting the data of equirectangular projection image to the external device such as the smart phone 5.

The electronic compass 118 calculates an orientation of the special image capturing device 1 from the Earth's magnetism to output orientation information. This orientation information is an example of related information, which is metadata described in compliance with Exif. This information is used for image processing such as image correction of captured images. The related information also includes a date and time when the image is captured by the special image capturing device 1, and a size of the image data.

The gyro sensor 119 detects the change in tilt of the special image capturing device 1 (roll, pitch, yaw) with movement of the special image capturing device 1. The change in angle is one example of related information (metadata) described in compliance with Exif. This information is used for image processing such as image correction of captured images.

The acceleration sensor 120 detects acceleration in three axial directions. The position (an angle with respect to the direction of gravity) of the special image capturing device 1 is determined, based on the detected acceleration. With the gyro sensor 119 and the acceleration sensor 120, accuracy in image correction improves.

The Micro USB terminal 121 is a connector to be connected with such as a Micro USB cable, or other electronic device.

<Hardware Configuration of Generic Image Capturing Device>

Next, referring to FIG. 12, a hardware configuration of the generic image capturing device 3 is described according to the embodiment. FIG. 12 illustrates the hardware configuration of the generic image capturing device 3. As illustrated in FIG. 12, the generic image capturing device 3 includes an imaging unit 301, an image processor 304, an imaging controller 305, a microphone 308, an audio processor 309, a bus 310, a CPU 311, a ROM 312, a SRAM 313, a DRAM 314, an operation unit 315, a network I/F 316, a communication circuit 317, an antenna 317a, an electronic compass 318, and a display 319. The image processor 304 and the imaging controller 305 are each connected to the CPU 311 via the bus 310.

The elements 304, 310, 311, 312, 313, 314, 315, 316, 317, 317a, and 318 of the generic image capturing device 3 are substantially similar in structure and function to the elements 104, 110, 111, 112, 113, 114, 115, 116, 117, 117a, and 118 of the special image capturing device 1, such that the description thereof is omitted.

Further, as illustrated in FIG. 12, in the imaging unit 301 of the generic image capturing device 3, a lens unit 306 having a plurality of lenses, a mechanical shutter button 307, and the imaging element 303 are disposed in this order from a side facing the outside (that is, a side to face the object to be captured).

The imaging controller 305 is substantially similar in structure and function to the imaging controller 105. The imaging controller 305 further controls operation of the lens unit 306 and the mechanical shutter button 307, according to user operation input through the operation unit 315.

The display 319 is capable of displaying an operational menu, an image being captured, or an image that has been captured, etc.

<Hardware Configuration of Smart Phone>

Referring to FIG. 13, a hardware configuration of the smart phone 5 is described according to the embodiment. FIG. 13 illustrates the hardware configuration of the smart phone 5. As illustrated in FIG. 13, the smart phone 5 includes a CPU 501, a ROM 502, a RAM 503, an EEPROM 504, a Complementary Metal Oxide Semiconductor (CMOS) sensor 505, an imaging element I/F 513a, an acceleration and orientation sensor 506, a medium I/F 508, and a GPS receiver 509.

The CPU 501 controls entire operation of the smart phone 5. The ROM 502 stores a control program for controlling the CPU 501 such as an IPL. The RAM 503 is used as a work area for the CPU 501. The EEPROM 504 reads or writes various data such as a control program for the smart phone 5 under control of the CPU 501. The CMOS sensor 505 captures an object (for example, the user operating the smart phone 5) under control of the CPU 501 to obtain captured image data. The imaging element I/F 513a is a circuit that controls driving of the CMOS sensor 505. The acceleration and orientation sensor 506 includes various sensors such as an electromagnetic compass for detecting geomagnetism, a gyrocompass, and an acceleration sensor. The medium I/F 508 controls reading or writing of data with respect to a recording medium 507 such as a flash memory. The GPS receiver 509 receives a GPS signal from a GPS satellite.

The smart phone 5 further includes a far-distance communication circuit 511, an antenna 511a for the far-distance communication circuit 511, a CMOS sensor 512, an imaging element I/F 513b, a microphone 514, a speaker 515, an audio input/output I/F 516, a display 517, an external device connection I/F 518, a near-distance communication circuit 519, an antenna 519a for the near-distance communication circuit 519, and a touch panel 521.

The far-distance communication circuit 511 is a circuit that communicates with other device through the communication network 100. The CMOS sensor 512 is an example of a built-in imaging device capable of capturing a subject under control of the CPU 501. The imaging element I/F 513a is a circuit that controls driving of the CMOS sensor 512. The microphone 514 is an example of built-in audio collecting device capable of inputting audio under control of the CPU 501. The audio I/O I/F 516 is a circuit for inputting or outputting an audio signal between the microphone 514 and the speaker 515 under control of the CPU 501. The display 517 may be a liquid crystal or organic electro luminescence (EL) display that displays an image of a subject, an operation icon, or the like. The external device connection I/F 518 is an interface circuit that connects the smart phone 5 to various external devices. The near-distance communication circuit 519 is a communication circuit that communicates in compliance with the Wi-Fi, NFC, Bluetooth, and the like. The touch panel 521 is an example of input device that enables the user to input a user instruction through touching a screen of the display 517.

The smart phone 5 further includes a bus line 510. Examples of the bus line 510 include an address bus and a data bus, which electrically connects the elements such as the CPU 501.

It should be noted that a recording medium such as a CD-ROM or HD storing any of the above-described programs may be distributed domestically or overseas as a program product.

<Functional Configuration of Image Capturing System>

Figure 14:
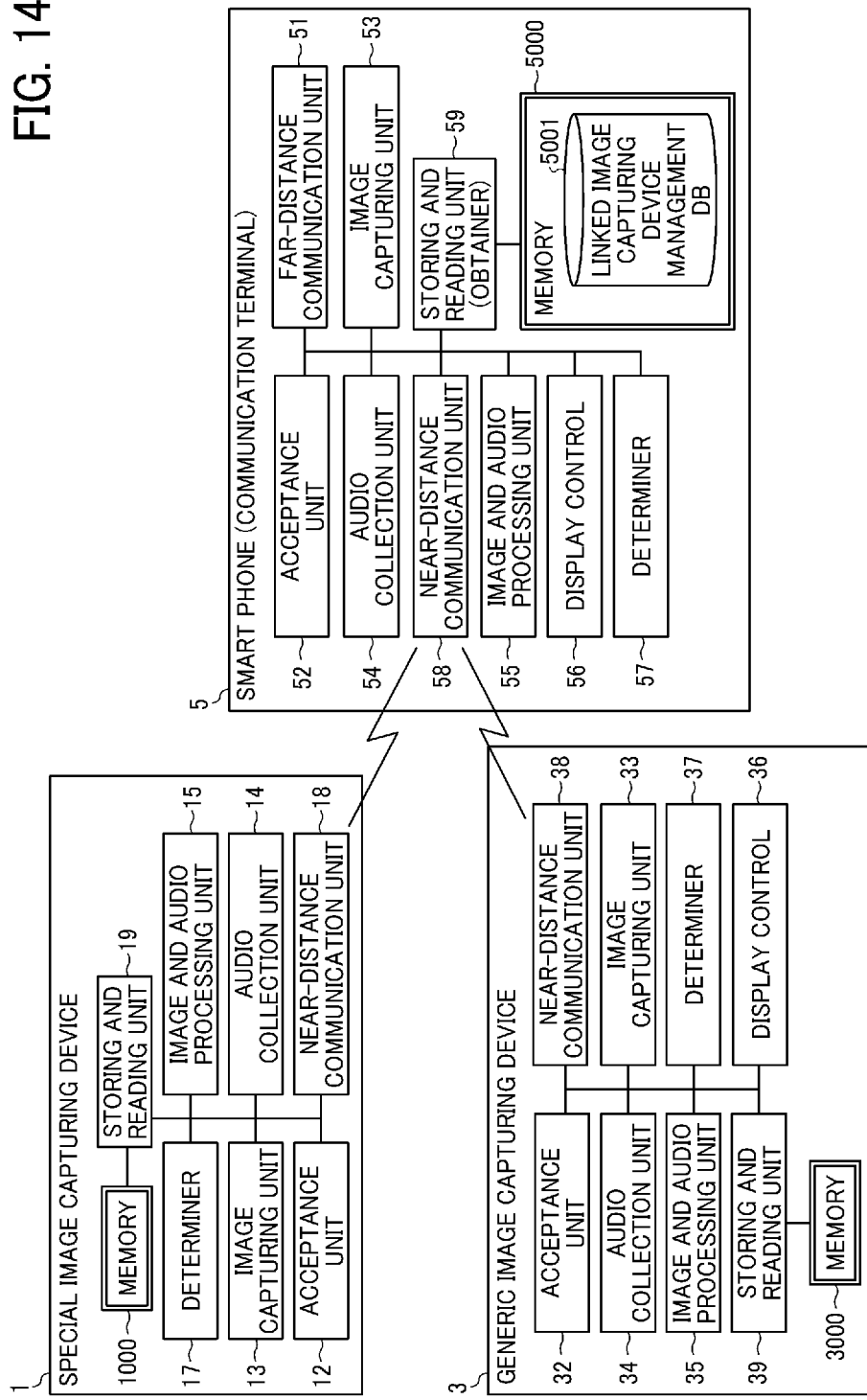
FIG. 14 is a functional block diagram of the image capturing system according to the first embodiment.

Referring now to FIGS. 11 to 14, a functional configuration of the image capturing system is described according to the embodiment. FIG. 14 is a schematic block diagram illustrating functional configurations of the special image capturing device 1, generic image capturing device 3, and smart phone 5, in the image capturing system, according to the embodiment.

<Functional Configuration of Special Image Capturing Device>

Referring to FIGS. 11 and 14, a functional configuration of the special image capturing device 1 is described according to the embodiment. As illustrated in FIG. 14, the special image capturing device 1 includes an acceptance unit 12, an image capturing unit 13, an audio collection unit 14, an image and audio processing unit 15, a determiner 17, a near-distance communication unit 18, and a storing and reading unit 19. These units are functions that are implemented by or that are caused to function by operating any of the elements illustrated in FIG. 11 in cooperation with the instructions of the CPU 111 according to the special image capturing device control program expanded from the SRAM 113 to the DRAM 114.

The special image capturing device 1 further includes a memory 1000, which is implemented by the ROM 112, the SRAM 113, and the DRAM 114 illustrated in FIG. 11.

Still referring to FIGS. 11 and 14, each functional unit of the special image capturing device 1 is described according to the embodiment.

The acceptance unit 12 of the special image capturing device 1 is implemented by the operation unit 115 illustrated in FIG. 11, which operates under control of the CPU 111. The acceptance unit 12 receives an instruction input from the operation unit 115 according to a user operation.

The image capturing unit 13 is implemented by the imaging unit 101, the image processor 104, and the imaging controller 105, illustrated in FIG. 11, each operating under control of the CPU 111. The image capturing unit 13 captures an image of the object or surroundings to obtain captured image data. As the captured image data, the two hemispherical images, from which the spherical image is generated, are obtained as illustrated in FIGS. 3A and 3B.

The audio collection unit 14 is implemented by the microphone 108 and the audio processor 109 illustrated in FIG. 11, each of which operates under control of the CPU 111. The audio collection unit 14 collects sounds around the special image capturing device 1.

The image and audio processing unit 15 is implemented by the instructions of the CPU 111, illustrated in FIG. 11. The image and audio processing unit 15 applies image processing to the captured image data obtained by the image capturing unit 13. The image and audio processing unit 15 applies audio processing to audio obtained by the audio collection unit 14. For example, the image and audio processing unit 15 generates data of the equirectangular projection image (FIG. 3C), using two hemispherical images (FIGS. 3A and 3B) respectively obtained by the imaging elements 103a and 103b.

The determiner 17, which is implemented by instructions of the CPU 111, performs various determinations.

The near-distance communication unit 18, which is implemented by instructions of the CPU 111, and the communication circuit 117 with the antenna 117a, communicates data with a near-distance communication unit 58 of the smart phone 5 using the near-distance wireless communication in compliance with such as Wi-Fi.

The storing and reading unit 19, which is implemented by instructions of the CPU 111 illustrated in FIG. 11, stores various data or information in the memory 1000 or reads out various data or information from the memory 1000.

<Functional Configuration of Generic Image Capturing Device>

Next, referring to FIGS. 12 and 14, a functional configuration of the generic image capturing device 3 is described according to the embodiment. As illustrated in FIG. 14, the generic image capturing device 3 includes an acceptance unit 32, an image capturing unit 33, an audio collection unit 34, an image and audio processing unit 35, a display control 36, a determiner 37, a near-distance communication unit 38, and a storing and reading unit 39. These units are functions that are implemented by or that are caused to function by operating any of the elements illustrated in FIG. 12 in cooperation with the instructions of the CPU 311 according to the image capturing device control program expanded from the SRAM 313 to the DRAM 314.

The generic image capturing device 3 further includes a memory 3000, which is implemented by the ROM 312, the SRAM 313, and the DRAM 314 illustrated in FIG. 12.

The acceptance unit 32 of the generic image capturing device 3 is implemented by the operation unit 315 illustrated in FIG. 12, which operates under control of the CPU 311. The acceptance unit 32 receives an instruction input from the operation unit 315 according to a user operation.

The image capturing unit 33 is implemented by the imaging unit 301, the image processor 304, and the imaging controller 305, illustrated in FIG. 12, each of which operates under control of the CPU 311. The image capturing unit 13 captures an image of the object or surroundings to obtain captured image data. In this example, the captured image data is planar image data, captured with a perspective projection method.

The audio collection unit 34 is implemented by the microphone 308 and the audio processor 309 illustrated in FIG. 12, each of which operates under control of the CPU 311. The audio collection unit 34 collects sounds around the generic image capturing device 3.

The image and audio processing unit 35 is implemented by the instructions of the CPU 311, illustrated in FIG. 12. The image and audio processing unit 35 applies image processing to the captured image data obtained by the image capturing unit 33. The image and audio processing unit 35 applies audio processing to audio obtained by the audio collection unit 34.

The display control 36, which is implemented by the instructions of the CPU 311 illustrated in FIG. 12, controls the display 319 to display a planar image P based on the captured image data that is being captured or that has been captured.

The determiner 37, which is implemented by instructions of the CPU 311, performs various determinations. For example, the determiner 37 determines whether the shutter button 315*a* has been pressed by the user.

The near-distance communication unit 38, which is implemented by instructions of the CPU 311, and the communication circuit 317 with the antenna 317*a*, communicates data with the near-distance communication unit 58 of the smart phone 5 using the near-distance wireless communication in compliance with such as Wi-Fi.

The storing and reading unit 39, which is implemented by instructions of the CPU 311 illustrated in FIG. 12, stores various data or information in the memory 3000 or reads out various data or information from the memory 3000.

<Functional Configuration of Smart Phone>

Referring now to FIGS. 13 to 16, a functional configuration of the smart phone 5 is described according to the embodiment. As illustrated in FIG. 14, the smart phone 5 includes a far-distance communication unit 51, an acceptance unit 52, an image capturing unit 53, an audio collection unit 54, an image and audio processing unit 55, a display control 56, a determiner 57, the near-distance communication unit 58, and a storing and reading unit 59. These units are functions that are implemented by or that are caused to function by operating any of the hardware elements illustrated in FIG. 13 in cooperation with the instructions of the CPU 501 according to the control program for the smart phone 5, expanded from the EEPROM 504 to the RAM 503.

The smart phone 5 further includes a memory 5000, which is implemented by the ROM 502, RAM 503 and EEPROM 504 illustrated in FIG. 13. The memory 5000 stores a linked image capturing device management DB 5001. The linked image capturing device management DB 5001 is implemented by a linked image capturing device management table illustrated in FIG. 15A. FIG. 15A is a conceptual diagram illustrating the linked image capturing device management table, according to the embodiment.

Referring now to FIG. 15A, the linked image capturing device management table is described according to the embodiment. As illustrated in FIG. 15A, the linked image capturing device management table stores, for each image capturing device, linking information indicating a relation to the linked image capturing device, an IP address of the image capturing device, and a device name of the image capturing device, in association with one another. The linking information indicates whether the image capturing device is "main" device or "sub" device in performing the linking function. The image capturing device as the "main" device, starts capturing the image in response to pressing of the shutter button provided for that device. The image capturing device as the "sub" device, starts capturing the image in response to pressing of the shutter button provided for the "main" device. The IP address is one example of destination information of the image capturing device. The IP address is used in case the image capturing device communicates using Wi-Fi. Alternatively, a manufacturer's identification (ID) or a product ID may be used in case the image capturing device communicates using a wired USB cable. Alternatively, a Bluetooth Device (BD) address is used in case the image capturing device communicates using wireless communication such as Bluetooth.

The far-distance communication unit 51 of the smart phone 5 is implemented by the far-distance communication circuit 511 that operates under control of the CPU 501, illustrated in FIG. 13, to transmit or receive various data or information to or from other device (for example, other smart phone or server) through a communication network such as the Internet.

The acceptance unit 52 is implement by the touch panel 521, which operates under control of the CPU 501, to receive various selections or inputs from the user. While the touch panel 521 is provided separately from the display 517 in FIG. 13, the display 517 and the touch panel 521 may be integrated as one device. Further, the smart phone 5 may include any hardware key, such as a button, to receive the user instruction, in addition to the touch panel 521.

The image capturing unit 53 is implemented by the CMOS sensors 505 and 512, which operate under control of the CPU 501, illustrated in FIG. 13. The image capturing unit 13 captures an image of the object or surroundings to obtain captured image data.

In this example, the captured image data is planar image data, captured with a perspective projection method.

The audio collection unit 54 is implemented by the microphone 514 that operates under control of the CPU 501. The audio collecting unit 14*a* collects sounds around the smart phone 5.

The image and audio processing unit 55 is implemented by the instructions of the CPU 501, illustrated in FIG. 13. The image and audio processing unit 55 applies image processing to an image of the object that has been captured by the image capturing unit 53. The image and audio processing unit 15 applies audio processing to audio obtained by the audio collection unit 54.

The display control 56, which is implemented by the instructions of the CPU 501 illustrated in FIG. 13, controls the display 517 to display the planar image P based on the captured image data that is being captured or that has been captured by the image capturing unit 53. The display control 56 superimposes the planar image P, on the spherical image CE, using superimposed display metadata, generated by the image and audio processing unit 55. With the superimposed display metadata, each grid area LA0 of the planar image P is placed at a location indicated by a location parameter, and is adjusted to have a brightness value and a color value indicated by a correction parameter. This enables the planar image P to be displayed in various display forms, for example, by changing a zoom ratio or a projection method.

In this example, the location parameter is one example of location information. The correction parameter is one example of correction information.

The determiner 57 is implemented by the instructions of the CPU 501, illustrated in FIG. 13, to perform various determinations.

The near-distance communication unit 58, which is implemented by instructions of the CPU 501, and the near-distance communication circuit 519 with the antenna 519*a*, communicates data with the near-distance communication unit 18 of the special image capturing device 1, and the near-distance communication unit 38 of the generic image capturing device 3, using the near-distance wireless communication in compliance with such as Wi-Fi.

The storing and reading unit 59, which is implemented by instructions of the CPU 501 illustrated in FIG. 13, stores various data or information in the memory 5000 or reads out various data or information from the memory 5000. For example, the superimposed display metadata may be stored in the memory 5000. In this embodiment, the storing and reading unit 59 functions as an obtainer that obtains various data from the memory 5000.

Figure 16:
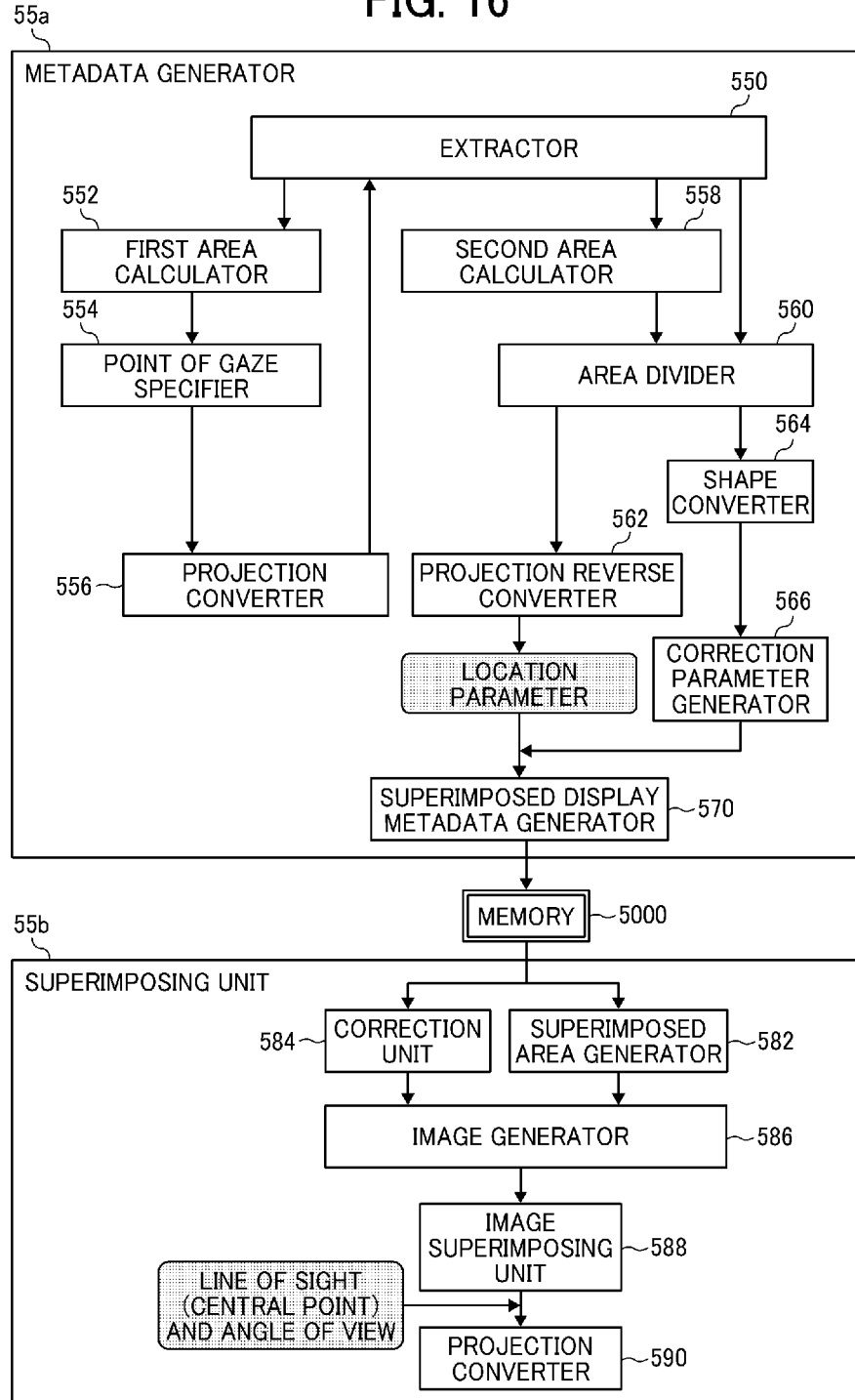
FIG. 16 is a block diagram illustrating a functional configuration of an image and audio processing unit according to the first embodiment.

Referring to FIG. 16, a functional configuration of the image and audio processing unit 55 is described according to the embodiment. FIG. 16 is a block diagram illustrating the functional configuration of the image and audio processing unit 55 according to the embodiment.

Figure 19:
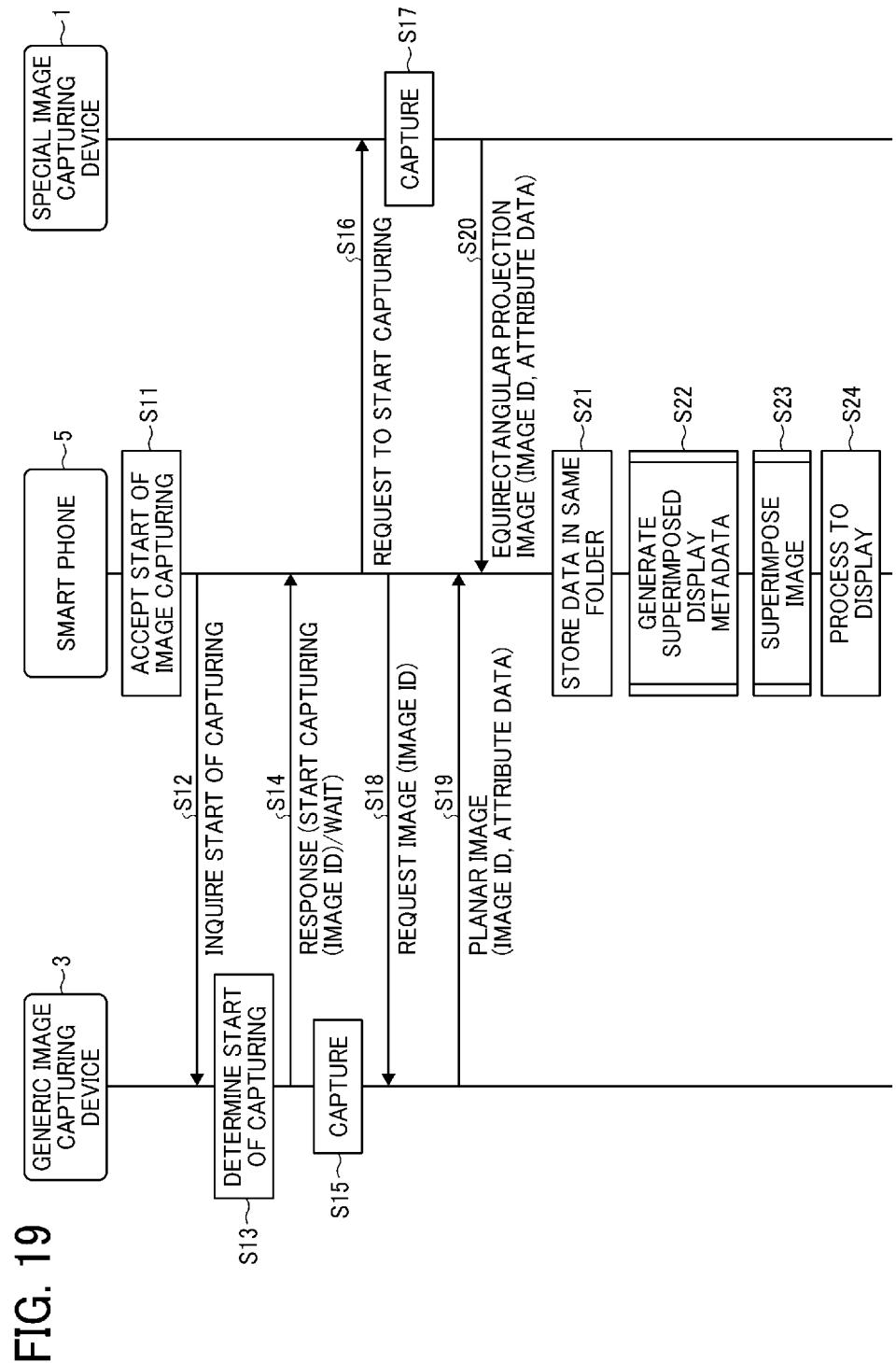
FIG. 19 is a data sequence diagram illustrating operation of capturing the image, performed by the image capturing system, according to the first embodiment.

The image and audio processing unit 55 mainly includes a metadata generator 55*a* that performs encoding, and a superimposing unit 55*b* that performs decoding. In this example, the encoding corresponds to processing to generate metadata to be used for superimposing images for display ("superimposed display metadata"). Further, in this example, the decoding corresponds to processing to generate images for display using the superimposed display metadata. The metadata generator 55*a* performs processing of S22, which is processing to generate superimposed display metadata, as illustrated in FIG. 19. The superimposing unit 55*b* performs processing of S23, which is processing to superimpose the images using the superimposed display metadata, as illustrated in FIG. 19.

Figure 20:
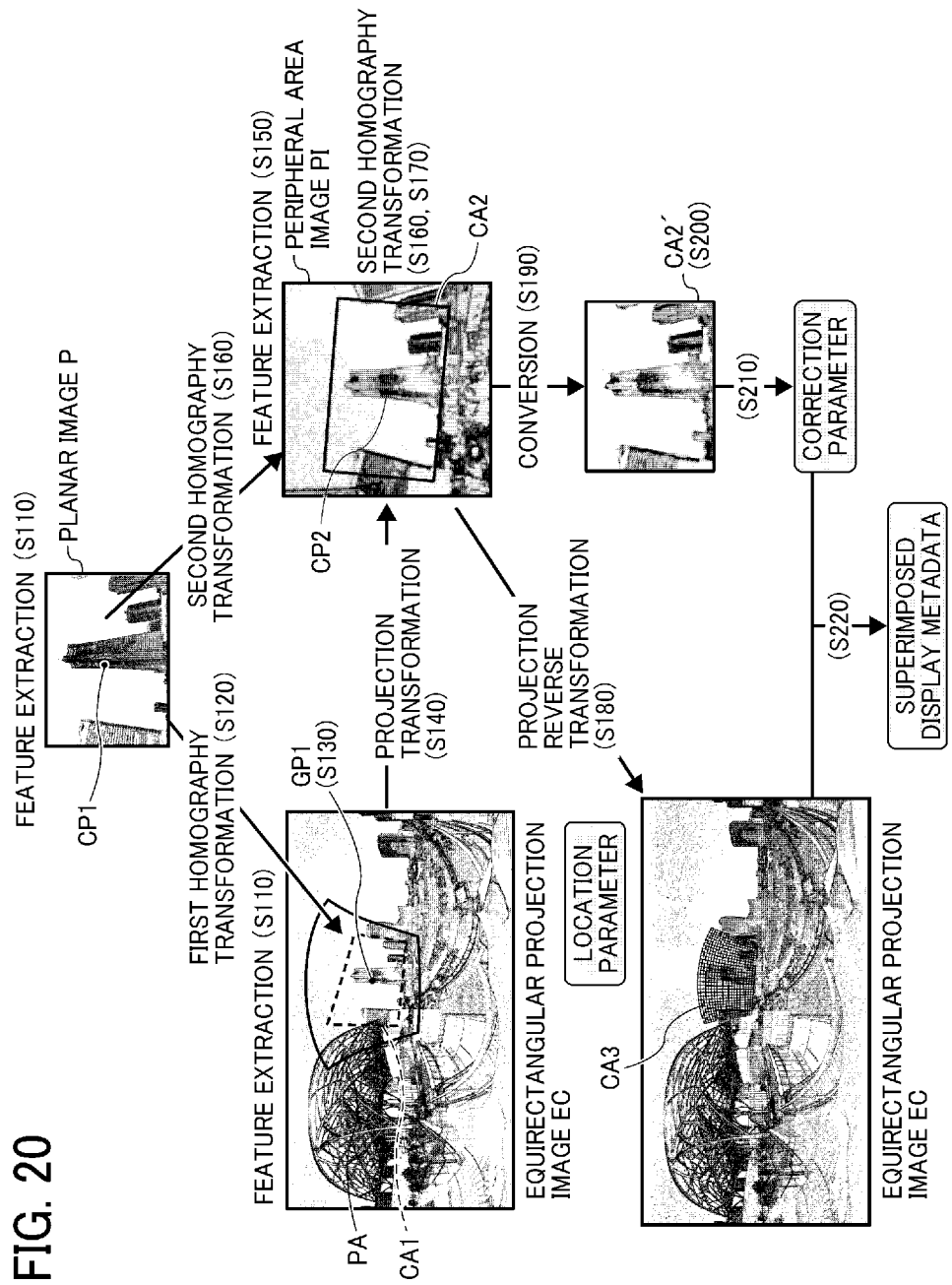
FIG. 20 is a conceptual diagram illustrating operation of generating a superimposed display metadata, according to the first embodiment.

First, a functional configuration of the metadata generator 55*a* is described according to the embodiment. The metadata generator 55*a* includes an extractor 550, a first area calculator 552, a point of gaze specifier 554, a projection converter 556, a second area calculator 558, an area divider 560, a projection reverse converter 562, a shape converter 564, a correction parameter generator 566, and a superimposed display metadata generator 570. In case the brightness and color is not to be corrected, the shape converter 564 and the correction parameter generator 566 do not have to be provided. FIG. 20 is a conceptual diagram illustrating operation of generating the superimposed display metadata, with images processed or generated in such operation.

The extractor 550 extracts feature points according to local features of each of two images having the same object. The feature points are distinctive keypoints in both images. The local features correspond to a pattern or structure detected in the image such as an edge or blob. In this embodiment, the extractor 550 extracts the features points for each of two images that are different from each other. These two images to be processed by the extractor 550 may be the images that have been generated using different image projection methods. Unless the difference in projection methods cause highly distorted images, any desired image projection methods may be used. For example, referring to FIG. 20, the extractor 550 extracts feature points from the rectangular, equirectangular projection image EC in equirectangular projection (S110), and the rectangular, planar image P in perspective projection (S110), based on local features of each of these images including the same object. Further, the extractor 550 extracts feature points from the rectangular, planar image P (S110), and a peripheral area image PI converted by the projection converter 556 (S150), based on local features of each of these images having the same object. In this embodiment, the equirectangular projection method is one example of a first projection method, and the perspective projection method is one example of a second projection method. The equirectangular projection image is one example of the first projection image, and the planar image P is one example of the second projection image.

The first area calculator 552 calculates the feature value fv1 based on the plurality of feature points fp1 in the equirectangular projection image EC. The first area calculator 552 further calculates the feature value fv2 based on the plurality of feature points fp2 in the planar image P. The feature values, or feature points, may be detected in any desired method. However, it is desirable that feature values, or feature points, are invariant or robust to changes in scale or image rotation. The first area calculator 552 specifies corresponding points between the images, based on similarity between the feature value fv1 of the feature points fp1 in the equirectangular projection image EC, and the feature value fv2 of the feature points fp2 in the planar image P. Based on the corresponding points between the images, the first area calculator 552 calculates the homography for transformation between the equirectangular projection image EC and the planar image P. The first area calculator 552 then applies first homography transformation to the planar image P (S120). Accordingly, the first area calculator 552 obtains a first corresponding area CA1 ("first area CA1"), in the equirectangular projection image EC, which corresponds to the planar image P. In such case, a central point CP1 of a rectangle defined by four vertices of the planar image P, is converted to the point of gaze GP1 in the equirectangular projection image EC, by the first homography transformation.

Here, the coordinates of four vertices p1, p2, p3, and p4 of the planar image P are p1=(x1, y1), p2=(x2, y2), p3=(x3, y3), and p4=(x4, y4). The first area calculator 552 calculates the central point CP1 (x, y) using the equation 2 below.

$$S1=\{(x4-x2)*(y1-y2)-(y4-y2)*(x1-x2)\}/2, S2=\{(x4-x2)*(y2-y3)-(y4-y2)*(x2-x3)\}/2, x=x1+(x3-x1)*S1/(S1+S2), y=y1+(y3-y1)*S1/(S1+S2)$$ (Equation 2)

While the planar image P is a rectangle in the case of FIG. 20, the central point CP1 may be calculated using the equation 2 with an intersection of diagonal lines of the planar image P, even when the planar image P is a square, trapezoid, or rhombus. When the planar image P has a shape of rectangle or square, the central point of the diagonal line may be set as the central point CP1. In such case, the central points of the diagonal lines of the vertices p1 and p3 are calculated, respectively, using the equation 3 below.

$$x=(x1+x3)/2, y=(y1+y3)/2$$ (Equation 3)

The point of gaze specifier 554 specifies the point (referred to as the point of gaze) in the equirectangular projection image EC, which corresponds to the central point CP1 of the planar image P after the first homography transformation (S130).

Here, the point of gaze GP1 is expressed as a coordinate on the equirectangular projection image EC. The coordinate of the point of gaze GP1 may be transformed to the latitude and longitude. Specifically, a coordinate in the vertical direction of the equirectangular projection image EC is expressed as a latitude in the range of −90 degree (−0.5π) to +90 degree (+0.5π). Further, a coordinate in the horizontal direction of the equirectangular projection image EC is expressed as a longitude in the range of −180 degree (−π) to +180 degree (+π). With this transformation, the coordinate of each pixel, according to the image size of the equirectangular projection image EC, can be calculated from the latitude and longitude system.

The projection converter 556 extracts a peripheral area PA, which is a part surrounding the point of gaze GP1, from the equirectangular projection image EC. The projection converter 556 converts the peripheral area PA, from the equirectangular projection to the perspective projection, to generate a peripheral area image PI (S140). The peripheral area PA is determined, such that, after projection transformation, the square-shaped, peripheral area image PI has a vertical angle of view (or a horizontal angle of view), which is the same as the diagonal angle of view α of the planar image P. Here, the central point CP2 of the peripheral area image PI corresponds to the point of gaze GP1.

(Transformation of Projection)

The following describes transformation of a projection, performed at S140 of FIG. 20, in detail. As described above referring to FIGS. 3 to 5, the equirectangular projection image EC covers a surface of the sphere CS, to generate the spherical image CE. Therefore, each pixel in the equirectangular projection image EC corresponds to each pixel in the surface of the sphere CS, that is, the three-dimensional, spherical image. The projection converter 556 applies the following transformation equation. Here, the coordinate system used for the equirectangular projection image EC is expressed with (latitude, longitude)=(ea, aa), and the rectangular coordinate system used for the three-dimensional sphere CS is expressed with (x, y, z).

$$(x,y,z)=(\cos(ea)\times\cos(aa),\cos(ea)\times\sin(aa),\sin(ea)),$$
wherein the sphere CS has a radius of 1. (Equation 4)

The planar image P in perspective projection, is a two-dimensional image. When the planar image P is represented by the two-dimensional polar coordinate system (moving radius, argument)=(r, a), the moving radius r, which corresponds to the diagonal angle of view α, has a value in the range from 0 to tan (diagonal angle view/2). That is, 0<=r<=tan(diagonal angle view/2). The planar image P, which is represented by the two-dimensional rectangular coordinate system (u, v), can be expressed using the polar coordinate system (moving radius, argument)=(r, a) using the following transformation equation 5.

$$u=r\times\cos(a), v=r\times\sin(a)$$ (Equation 5)

The equation 5 is represented by the three-dimensional coordinate system (moving radius, polar angle, azimuth). For the surface of the sphere CS, the moving radius in the three-dimensional coordinate system is "1". The equirectangular projection image, which covers the surface of the sphere CS, is converted from the equirectangular projection to the perspective projection, using the following equations 6 and 7. Here, the equirectangular projection image is represented by the above-described two-dimensional polar coordinate system (moving radius, azimuth)=(r, a), and the virtual camera IC is located at the center of the sphere.

$$r=\tan(\text{polar angle})$$ (Equation 6)

$a$=azimuth Assuming that the polar angle is $t$, Equation 6 can be expressed as: $t=\arctan(r)$. (Equation 7)

Accordingly, the three-dimensional polar coordinate (moving radius, polar angle, azimuth) is expressed as (1,arctan(r),a).

The three-dimensional polar coordinate system is transformed into the rectangle coordinate system (x, y, z), using Equation 8.

$$(x,y,z)=(\sin(t)\times\cos(a),\sin(t)\times\sin(a),\cos(t))$$ (Equation 8)

Equation 8 is applied to convert between the equirectangular projection image EC in equirectangular projection, and the planar image P in perspective projection. More specifically, the moving radius r, which corresponds to the diagonal angle of view α of the planar image P, is used to calculate transformation map coordinates, which indicate correspondence of a location of each pixel between the planar image P and the equirectangular projection image EC. With this transformation map coordinates, the equirectangular projection image EC is transformed to generate the peripheral area image PI in perspective projection.

Through the above-described projection transformation, the coordinate (latitude=90°, longitude=0°) in the equirectangular projection image EC becomes the central point CP2 in the peripheral area image PI in perspective projection. In case of applying projection transformation to an arbitrary point in the equirectangular projection image EC as the point of gaze, the sphere CS covered with the equirectangular projection image EC is rotated such that the coordinate (latitude, longitude) of the point of gaze is positioned at (90°, 0°).

The sphere CS may be rotated using any known equation for rotating the coordinate.

(Determination of Peripheral Area Image)

Figure 21A:
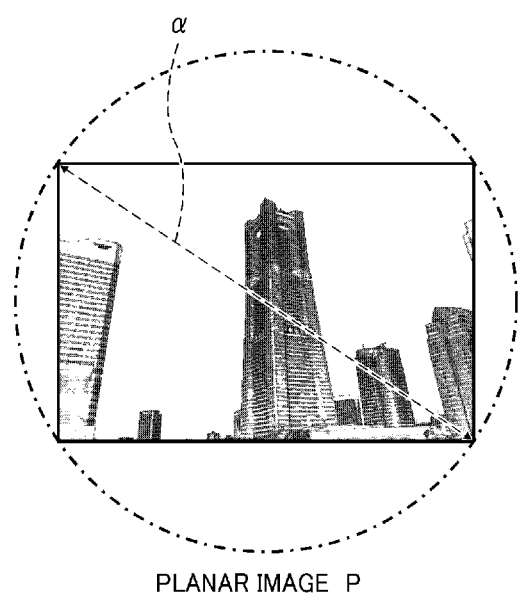
FIGS. 21A and 21B are conceptual diagrams for describing determination of a peripheral area image, according to the first embodiment.
Figure 21B:
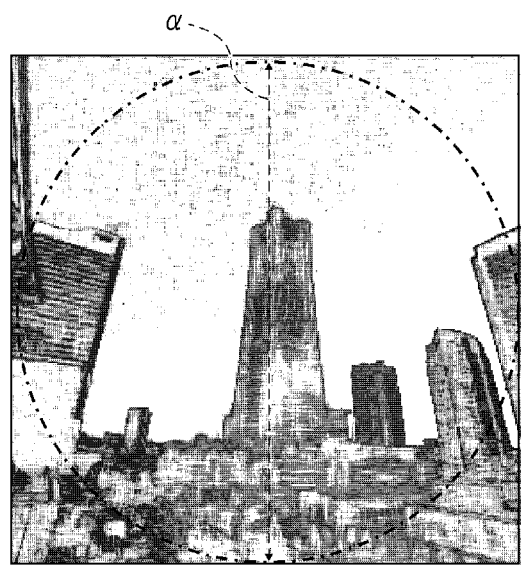

Next, referring to FIGS. 21A and 21B, determination of a peripheral area image P1 is described according to the embodiment. FIGS. 21A and 21B are conceptual diagrams for describing determination of the peripheral area image PI.

To enable the first area calculator 552 to determine correspondence between the planar image P and the peripheral area image PI, it is desirable that the peripheral area image PI is sufficiently large to include the entire second area CA2. If the peripheral area image PI has a large size, the second area CA2 is included in such large-size area image. With the large-size peripheral area image PI, however, the time required for processing increases as there are a large number of pixels subject to similarity calculation. For this reasons, the peripheral area image PI should be a minimum-size image area including at least the entire second area CA2. In this embodiment, the peripheral area image PI is determined as follows.

More specifically, the peripheral area image PI is determined using the 35 mm equivalent focal length of the planar image, which is obtained from the Exif data recorded when the image is captured. Since the 35 mm equivalent focal length is a focal length corresponding to the 24 mm×36 mm film size, it can be calculated from the diagonal and the focal length of the 24 mm×36 mm film, using Equations 9 and 10.

$$\text{film diagonal} = \text{sqrt}(24*24+36*36) \qquad \text{(Equation 9)}$$

$$\text{angle of view of the image to be combined}/2 = \arctan((\text{film diagonal}/2)/35 \text{ mm equivalent focal length of the image to be combined}) \qquad \text{(Equation 10)}$$

The image with this angle of view has a circular shape. Since the actual imaging element (film) has a rectangular shape, the image taken with the imaging element is a rectangle that is inscribed in such circle. In this embodiment, the peripheral area image PI is determined such that, a vertical angle of view $\alpha$ of the peripheral area image PI is made equal to a diagonal angle of view $\alpha$ of the planar image P. That is, the peripheral area image PI illustrated in FIG. 21B is a rectangle, circumscribed around a circle containing the diagonal angle of view $\alpha$ of the planar image P illustrated in FIG. 21A. The vertical angle of view $\alpha$ is calculated from the diagonal angle of a square and the focal length of the planar image P, using Equations 11 and 12.

$$\text{angle of view of square} = \text{sqrt}(\text{film diagonal}*\text{film diagonal}+\text{film diagonal}*\text{film diagonal}) \qquad \text{(Equation 11)}$$

$$\text{vertical angle of view } \alpha/2 = \arctan((\text{angle of view of square}/2)/35 \text{ mm equivalent focal length of planar image})) \qquad \text{(Equation 12)}$$

The calculated vertical angle of view $\alpha$ is used to obtain the peripheral area image PI in perspective projection, through projection transformation. The obtained peripheral area image PI at least contains an image having the diagonal angle of view $\alpha$ of the planar image P while centering on the point of gaze, but has the vertical angle of view $\alpha$ that is kept small as possible.

(Calculation of Location Information)

Referring back to FIGS. 16 and 20, the second area calculator 558 calculates the feature value fp2 of a plurality of feature points fp2 in the planar image P, and the feature value fp3 of a plurality of feature points fp3 in the peripheral area image PI. The second area calculator 558 specifies corresponding points between the images, based on similarity between the feature value fv2 and the feature value fv3. Based on the corresponding points between the images, the second area calculator 558 calculates the homography for transformation between the planar image P and the peripheral area image PI. The second area calculator 558 then applies second homography transformation to the planar image P (S160). Accordingly, the second area calculator 558 obtains a second (corresponding) area CA2 ("second area CA2"), in the peripheral area image PI, which corresponds to the planar image P (S170).

In the above-described transformation, in order to increase the calculation speed, an image size of at least one of the planar image P and the equirectangular projection image EC may be changed, before applying the first homography transformation. For example, assuming that the planar image P has 40 million pixels, and the equirectangular projection image EC has 30 million pixels, the planar image P may be reduced in size to 30 million pixels. Alternatively, both of the planar image P and the equirectangular projection image EC may be reduced in size to 10 million pixels. Similarly, an image size of at least one of the planar image P and the peripheral area image PI may be changed, before applying the second homography transformation.

The homography in this embodiment is a transformation matrix indicating the projection relation between the equirectangular projection image EC and the planar image P. The coordinate system for the planar image P is multiplied by the homography transformation matrix to convert into a corresponding coordinate system for the equirectangular projection image EC (spherical image CE).

Figure 22A:
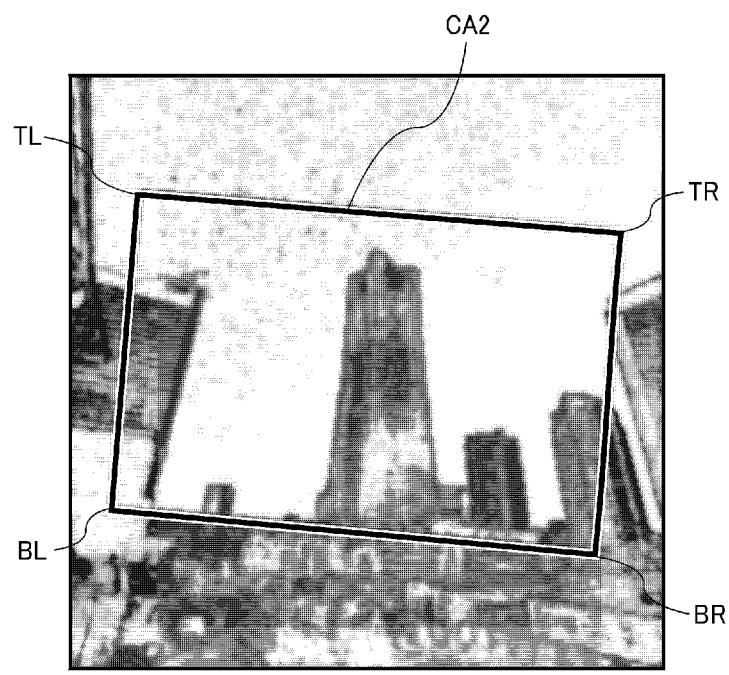
FIGS. 22A and 22B are conceptual diagrams for explaining operation of dividing the second area into a plurality of grid areas, according to the first embodiment.
Figure 22B:
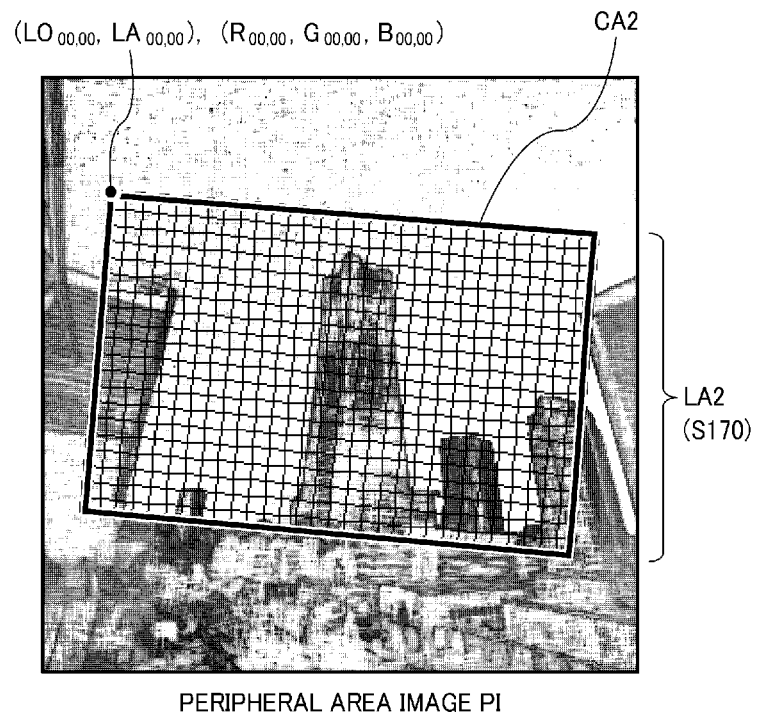

The area divider 560 divides a part of the image into a plurality of grid areas. Referring to FIGS. 22A and 22B, operation of dividing the second area CA2 into a plurality of grid areas is described according to the embodiment. FIGS. 22A and 22B illustrate conceptual diagrams for explaining operation of dividing the second area into a plurality of grid areas, according to the embodiment.

As illustrated in FIG. 22A, the second area CA2 is a rectangle defined by four vertices each obtained with the second homography transformation, by the second area calculator 558. As illustrated in FIG. 22B, the area divider 560 divides the second area CA2 into a plurality of grid areas LA2. For example, the second area CA2 is equally divided into 30 grid areas in the horizontal direction, and into 20 grid areas in the vertical direction.

Next, dividing the second area CA2 into the plurality of grid areas LA2 is explained in detail.

The second area CA2 is equally divided using the following equation. Assuming that a line connecting two points, A(X1, Y1) and B(X2, Y2), is to be equally divided into "n" coordinates, the coordinate of a point Pm that is the "m"th point counted from the point A is calculated using the equation 13.

$$Pm=(X1+(X2-X1)\times m/n, Y1+(Y2-Y1)\times m/n) \qquad \text{(Equation 13)}$$

With Equation 13, the line can be equally divided into a plurality of coordinates. The upper line and the lower line of the rectangle are each divided into a plurality of coordinates, to generate a plurality of lines connecting corresponding coordinates of the upper line and the lower line. The generated lines are each divided into a plurality of coordinates, to further generate a plurality of lines. Here, coordinates of points (vertices) of the upper left, upper right, lower right, and lower left of the rectangle are respectively represented by TL, TR, BR, and BL. The line connecting TL and TR, and the line connecting BR and BL are each equally divided into 30 coordinates (0 to 30th coordinates). Next, each of the lines connecting corresponding 0 to 30th coordinates of the TL-TR line and the BR-BL line, is equally divided into 20 coordinates. Accordingly, the rectangular area is divided into 30×20, sub-areas. FIG. 22B shows an example case of the coordinate ($LO_{00,00}$, $LA_{00,00}$) of the upper left point TL.

Figure 17:
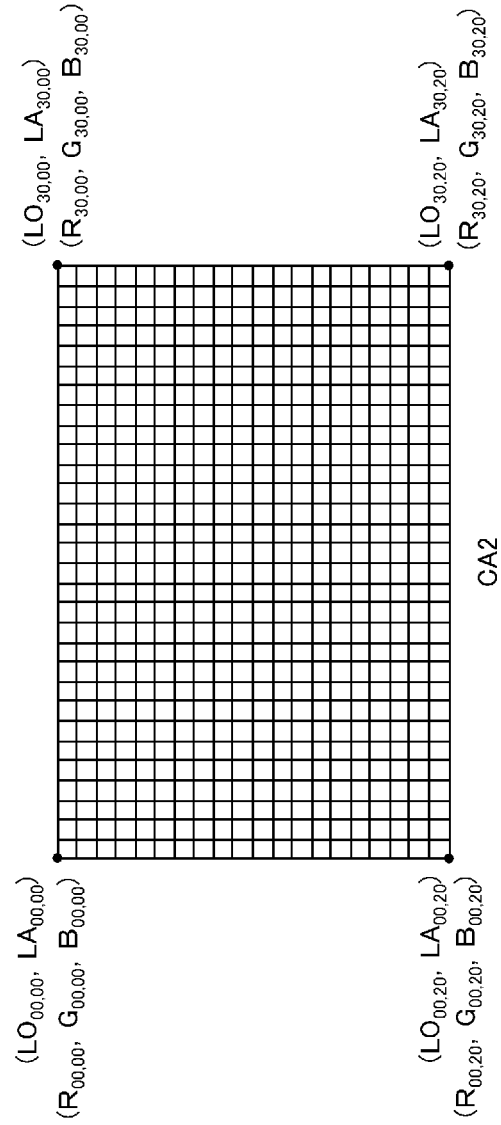
FIG. 17 is an illustration of a data structure of superimposed display metadata according to the first embodiment.
Figure 18:
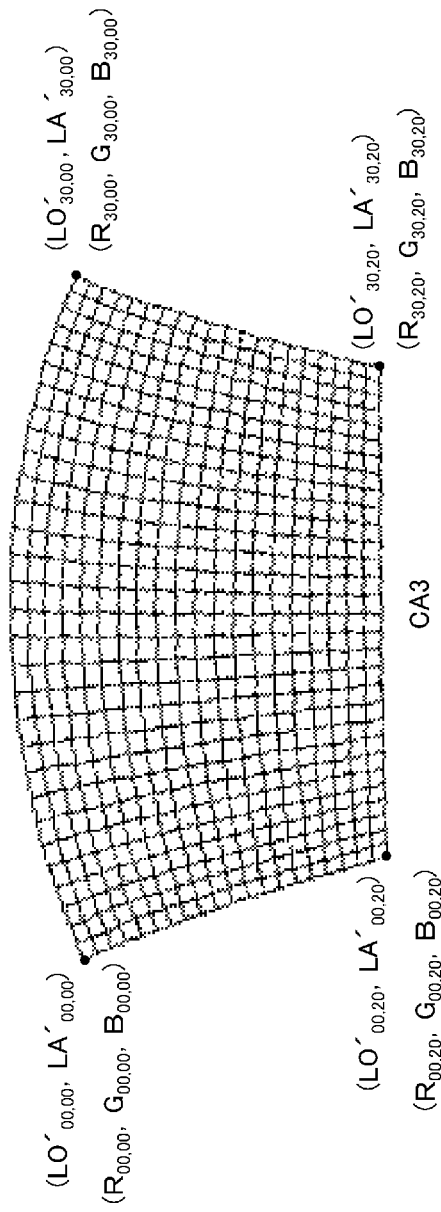
FIGS. 18A and 18B are conceptual diagrams respectively illustrating a plurality of grid areas in a second area, and a plurality of grid areas in a third area, according to the first embodiment.
Figure 23:
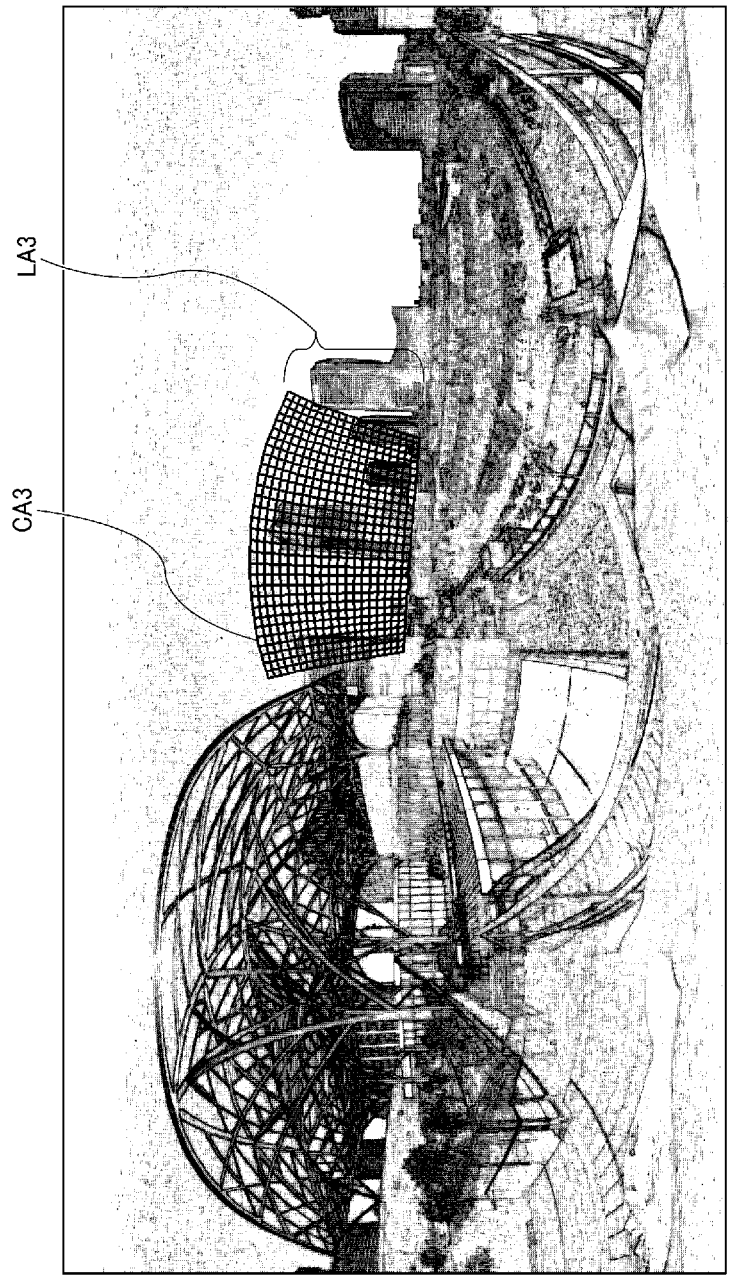
FIG. 23 is a conceptual diagram for explaining determination of the third area in the equirectangular projection image, according to the first embodiment.

Referring back to FIGS. 16 and 20, the projection reverse converter 562 reversely converts projection applied to the second area CA2, back to the equirectangular projection applied to the equirectangular projection image EC. With this projection transformation, the third area CA3 in the equirectangular projection image EC, which corresponds to the second area CA2, is determined. Specifically, the projection reverse converter 562 determines the third area CA3 in the equirectangular projection image EC, which contains a plurality of grid areas LA3 corresponding to the plurality of grid areas LA2 in the second area CA2. FIG. 23 illustrates an enlarged view of the third area CA3 illustrated in FIG. 20. FIG. 23 is a conceptual diagram for explaining determination of the third area CA3 in the equirectangular projection image EC. The planar image P is superimposed on the spherical image CE, which is generated from the equirectangular projection image EC, so as to fit in a portion defined by the third area CA3 by mapping. Through processing by the projection reverse converter 562, a location parameter is generated, which indicates the coordinate of each grid in each grid area LA3. The location parameter is illustrated in FIG. 17 and FIG. 18B. In this example, the gird may be referred to as a single point of a plurality of points.

As described above, the location parameter is generated, which is used to calculate the correspondence of each pixel between the equirectangular projection image EC and the planar image P.

Although the planar image P is superimposed on the equirectangular projection image EC at a right location with the location parameter, these image EC and image P may vary in brightness or color (such as tone), causing an unnatural look. The shape converter 564 and the correction parameter generator 566 are provided to avoid this unnatural look, even when these images that differ in brightness and color, are partly superimposed one above the other.

Figure 24A:
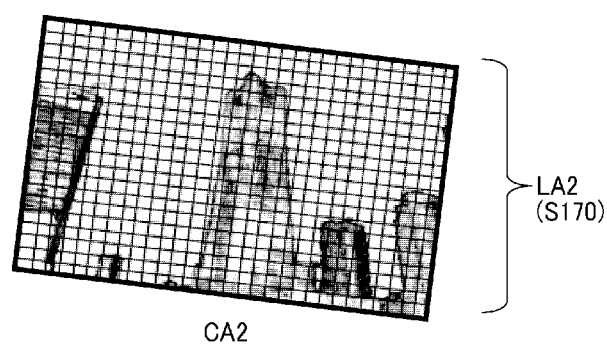
FIGS. 24A, 24B, and 24C are conceptual diagrams illustrating operation of generating a correction parameter, according to the first embodiment.

Before applying color correction, the shape converter 564 converts the second area CA2 to have a shape that is the same as the shape of the planar image P. To made the shape equal, the shape converter 564 maps four vertices of the second area CA2, on corresponding four vertices of the planar image P. More specifically, the shape of the second area CA2 is made equal to the shape of the planar image P, such that each grid area LA2 in the second area CA2 illustrated in FIG. 24A, is located at the same position of each grid area LA0 in the planar image P illustrated in FIG. 24C. That is, a shape of the second area CA2 illustrated in FIG. 24A is converted to a shape of the second area CA2' illustrated in FIG. 24B. As each grid area LA2 is converted to the corresponding grid area LA2', the grid area LA2' becomes equal in shape to the corresponding grid area LA0 in the planar image P.

The correction parameter generator 566 generates the correction parameter, which is to be applied to each grid area LA2' in the second area CA2', such that each grid area LA2' is equal to the corresponding grid area LA0 in the planar image P in brightness and color. Specifically, the correction parameter generator 566 specifies four grid areas LA0 that share one common grid, and calculates an average avg= $(R_{ave}, G_{ave}, B_{ave})$ of brightness and color values (R, G, B) of all pixels contained in the specified four grid areas LA0. Similarly, the correction parameter generator 566 specifies four grid areas LA2' that share one common grid, and calculates an average avg'= $(R_{ave}, G_{ave}, B_{ave})$ of brightness and color values (R, G, B) of all pixels contained in the specified four grid areas LA2'. If one gird of the specified grid areas LA0 and the corresponding grid of the specific grid areas LA2' correspond to one of four vertices of the second area CA2 (or the third area CA3), the correction parameter generator 566 calculates the average avg and the average avg' of the brightness and color of pixels from one grid area located at the corner. If one grid of the specific grid areas LA0 and the corresponding grid of the specific grid areas LA2' correspond to a gird of the outline of the second area CA2 (or the third area CA3), the correction parameter generator 566 calculates the average avg and the average avg' of the brightness and color of pixels from two grid areas inside the outline. In this embodiment, the correction parameter is gain data for correcting the brightness and color of the planar image P. Accordingly, the correction parameter Pa is obtained by dividing the avg' by the avg, as represented by the following equation 14.

$$Pa = \text{avg}'/\text{avg} \quad \text{(Equation 14)}$$

In displaying images being superimposed, each grid area LA0 is multiplied with the gain, represented by the correction parameter. Accordingly, the brightness and color of the planar image P is made substantially equal to that of the equirectangular projection image EC (spherical image CE). This prevents unnatural look, even when the planar image P is superimposed on the equirectangular projection image EC. In addition to or in alternative to the average value, the correction parameter may be calculated using the median or the most frequent value of brightness and color of pixels in the grid areas.

In this embodiment, the values (R, G, B) are used to calculate the brightness and color of each pixel. Alternatively, any other color space may be used to obtain the brigthness and color, such as brightness and color difference using YUV, and brigthness and color difference using sYCC (YCbCr) according to the JPEG. The color space may be converted from RGB, to YUV, or to sYCC (YCbCr), using any desired known method. For example, RGB, in compliance with JPEG file interchange format (JFIF), may be converted to YCbCr, using Equation 15.

$$\begin{pmatrix} Y \\ Cb \\ Cr \end{pmatrix} = \begin{pmatrix} 0.299 & 0.587 & 0.114 \\ -0.1687 & -0.3313 & 0.5 \\ 0.5 & -0.4187 & -0.0813 \end{pmatrix} \begin{pmatrix} R \\ G \\ B \end{pmatrix} + \begin{pmatrix} 0 \\ 128 \\ 128 \end{pmatrix} \quad \text{(Equation 15)}$$

The superimposed display metadata generator 570 generates superimposed display metadata indicating a location where the planar image P is superimposed on the spherical image CE, and correction values for correcting brightness and color of pixels, using such as the location parameter and the correction parameter.

(Superimposed Display Metadata)

Referring to FIG. 17, a data structure of the superimposed display metadata is described according to the embodiment. FIG. 17 illustrates a data structure of the superimposed display metadata according to the embodiment.

As illustrated in FIG. 17, the superimposed display metadata includes equirectangular projection image information, planar image information, superimposed display information, and metadata generation information.

The equirectangular projection image information is transmitted from the special image capturing device 1, with the captured image data. The equirectangular projection image information includes an image identifier (image ID) and attribute data of the captured image data. The image identifier, included in the equirectangular projection image information, is used to identify the equirectangular projection image. While FIG. 17 uses an image file name as an example of image identifier, an image ID for uniquely identifying the image may be used instead.

The attribute data, included in the equirectangular projection image information, is any information related to the equirectangular projection image. In the case of metadata of FIG. 17, the attribute data includes positioning correction data (Pitch, Yaw, Roll) of the equirectangular projection image, which is obtained by the special image capturing device 1 in capturing the image. The positioning correction data is stored in compliance with a standard image recording format, such as Exchangeable image file format (Exif). Alternatively, the positioning correction data may be stored in any desired format defined by Google Photo Sphere schema (GPano). As long as an image is taken at the same place, the special image capturing device 1 captures the image in 360 degrees with any positioning. However, in displaying such spherical image CE, the positioning information and the center of image (point of gaze) should be specified. Generally, the spherical image CE is corrected for display, such that its zenith is right above the user capturing the image. With this correction, a horizontal line is displayed as a straight line, thus the displayed image have more natural look.

The planar image information is transmitted from the generic image capturing device 3 with the captured image data. The planar image information includes an image identifier (image ID) and attribute data of the captured image data. The image identifier, included in the planar image information, is used to identify the planar image P. While FIG. 17 uses an image file name as an example of image identifier, an image ID for uniquely identifying the image may be used instead.

The attribute data, included in the planar image information, is any information related to the planar image P. In the case of metadata of FIG. 17, the planar image information includes, as attribute data, a value of 35 mm equivalent focal length. The value of 35 mm equivalent focal length is not necessary to display the image on which the planar image P is superimposed on the spherical image CE. However, the value of 35 mm equivalent focal length may be referred to determine an angle of view when displaying superimposed images.

The superimposed display information is generated by the smart phone 5. In this example, the superimposed display information includes area division number information, a coordinate of a grid in each grid area (location parameter), and correction values for brightness and color (correction parameter). The area division number information indicates a number of divisions of the first area CA1, both in the horizontal (longitude) direction and the vertical (latitude) direction. The area division number information is referred to when dividing the first area CA1 into a plurality of grid areas.

The location parameter is mapping information, which indicates, for each grid in each grid area of the planar image P, a location in the equirectangular projection image EC. For example, the location parameter associates a location of each grid in each grid area in the equirectangular projection image EC, with each grid in each grid area in the planar image P. The correction parameter, in this example, is gain data for correcting color values of the planar image P. Since the target to be corrected may be a monochrome image, the correction parameter may be used only to correct the brightness value. Accordingly, at least the brightness of the image is to be corrected using the correction parameter.

The perspective projection, which is used for capturing the planar image P, is not applicable to capturing the 360-degree omnidirectional image, such as the spherical image CE. The wide-angle image, such as the spherical image, is often captured in equirectangular projection. In equirectangular projection, like Mercator projection, the distance between lines in the horizontal direction increases away from the standard parallel. This results in generation of the image, which looks very different from the image taken with the general-purpose camera in perspective projection. If the planar image P, superimposed on the spherical image CE, is displayed, the planar image P and the spherical image CE that differ in projection, look different from each other. Even scaling is made equal between these images, the planar image P does not fit in the spherical image CE. In view of the above, the location parameter is generated as described above referring to FIG. 20.

Referring to FIGS. 18A and 18B, the location parameter and the correction parameter are described in detail, according to the embodiment. FIG. 18A is a conceptual diagram illustrating a plurality of grid areas in the second area CA2, according to the embodiment. FIG. 18B is a conceptual diagram illustrating a plurality of grid areas in the third area CA3, according to the embodiment.

As described above, the first area CA1, which is a part of the equirectangular projection image EC, is converted to the second area CA2 in perspective projection, which is the same projection with the projection of the planar image P. As illustrated in FIG. 18A, the second area CA2 is divided into 30 grid areas in the horizontal direction, and 20 grid areas in the vertical direction, resulting in 600 grid areas in total. Still referring to FIG. 18A, the coordinate of each grid in each grid area can be expressed by $(LO_{00,00}, LA_{00,00})$, $(LO_{01,00}, LA_{01,00})$, ..., $(LO_{30,20}, LA_{30,20})$. The correction value of brightness and color of each grid in each grid area can be expressed by $(R_{00,00}, G_{00,00}, B_{00,00})$, $(R_{01,00}, G_{01,00}, B_{01,00})$, ..., $(R_{30,20}, G_{30,20}, B_{30,20})$. For simplicity, in FIG. 18A, only four vertices (grids) are each shown with the coordinate value, and the correction value for brightness and color. However, the coordinate value and the correction value for brightness and color, are assigned to each of all girds. The correction values R, G, B for brightness and color, corresponds to correction gains for red, green, and blue, respectively. In this example, the correction values R, G, B for brightness and color, are generated for a predetermined area centering on a specific grid. The specific grid is selected, such that the predetermined area of such grid does not overlap with a predetermined area of an adjacent specific gird.

As illustrated in FIG. 18B, the second area CA2 is reverse converted to the third area CA3 in equirectangular projection, which is the same projection with the projection of the equirectangular projection image EC. In this embodiment, the third area CA3 is equally divided into 30 grid areas in the horizontal direction, and 20 grid areas in the vertical direction, resulting in 600 grid areas in total. Referring to FIG. 18B, the co-coordinate of each grid in each area can be expressed by $(LO'_{00,00}, LA'_{00,00})$, $(LO'_{01,00}, LA'_{01,00})$, ..., $(LO'_{30,20}, LA'_{30,20})$. The correction values of brightness and color of each grid in each grid area are the same as the correction values of brightness and color of each grid in each grid area in the second area CA2. For simplicity, in FIG. 18B, only four vertices (grids) are each shown with the coordinate value, and the correction value for brightness and color. However, the coordinate value and the correction value for brightness and color, are assigned to each of all girds.

Referring back to FIG. 17, the metadata generation information includes version information indicating a version of the superimposed display metadata.

As described above, the location parameter indicates correspondence of pixel positions, between the planar image P and the equirectangular projection image EC (spherical image CE). If such correspondence information is to be provided for all pixels, data for about 40 million pixels is needed in case the generic image capturing device 3 is a high-resolution digital camera. This increases processing load due to the increased data size of the location parameter. In view of this, in this embodiment, the planar image P is divided into 600 (30×20) grid areas. The location parameter indicates correspondence of each gird in each of 600 grid areas, between the planar image P and the equirectangular projection image EC (spherical image CE). When displaying the superimposed images by the smart phone 5, the smart phone 5 may interpolate the pixels in each grid area based on the coordinate of each grid in that grid area.

(Functional Configuration of Superimposing Unit)

Referring to FIG. 16, a functional configuration of the superimposing unit 55b is described according to the embodiment. The superimposing unit 55b includes a superimposed area generator 582, a correction unit 584, an image generator 586, an image superimposing unit 588, and a projection converter 590.

The superimposed area generator 582 specifies a part of the sphere CS, which corresponds to the third area CA3, to generate a partial sphere PS.

The correction unit 584 corrects the brightness and color of the planar image P, using the correction parameter of the superimposed display metadata, to match the brightness and color of the equirectangular projection image EC. The correction unit 584 may not always perform correction on brightness and color. In one example, the correction unit 584 may only correct the brightness of the planar image P using the correction parameter.

The image generator 586 superimposes (maps) the planar image P (or the corrected image C of the planar image P), on the partial sphere PS to generate an image to be superimposed on the spherical image CE, which is referred to as a superimposed image S for simplicity. The image generator 586 generates mask data M, based on a surface area of the partial sphere PS. The image generator 586 covers (attaches) the equirectangular projection image EC, over the sphere CS, to generate the spherical image CE.

The mask data M, having information indicating the degree of transparency, is referred to when superimposing the superimposed image S on the spherical image CE. The mask data M sets the degree of transparency for each pixel, or a set of pixels, such that the degree of transparency increases from the center of the superimposed image S toward the boundary of the superimposed image S with the spherical image CE. With this mask data M, the pixels around the center of the superimposed image S have brightness and color of the superimposed image S, and the pixels near the boundary between the superimposed image S and the spherical image CE have brightness and color of the spherical image CE. Accordingly, superimposition of the superimposed image S on the spherical image CE is made unnoticeable. However, application of the mask data M can be made optional, such that the mask data M does not have to be generated.

The image superimposing unit 588 superimposes the superimposed image S and the mask data M, on the spherical image CE. The image is generated, in which the high-definition superimposed image S is superimposed on the low-definition spherical image CE.

As illustrated in FIG. 7, the projection converter 590 converts projection, such that the predetermined area T of the spherical image CE, with the superimposed image S being superimposed, is displayed on the display 517, for example, in response to a user instruction for display. The projection transformation is performed based on the line of sight of the user (the direction of the virtual camera IC, represented by the central point CP of the predetermined area T), and the angle of view α of the predetermined area T. In projection transformation, the projection converter 590 converts a resolution of the predetermined area T, to match with a resolution of a display area of the display 517. Specifically, when the resolution of the predetermined area T is less than the resolution of the display area of the display 517, the projection converter 590 enlarges a size of the predetermined area T to match the display area of the display 517. In contrary, when the resolution of the predetermined area T is greater than the resolution of the display area of the display 517, the projection converter 590 reduces a size of the predetermined area T to match the display area of the display 517. Accordingly, the display control 56 displays the predetermined-area image Q, that is, the image of the predetermined area T, in the entire display area of the display 517.

Referring now to FIGS. 19 to 30, operation of capturing the image and displaying the image, performed by the image capturing system, is described according to the embodiment. First, referring to FIG. 19, operation of capturing the image, performed by the image capturing system, is described according to the embodiment. FIG. 19 is a data sequence diagram illustrating operation of capturing the image, according to the embodiment. The following describes the example case in which the object and surroundings of the object are captured. However, in addition to capturing the object, audio may be recorded by the audio collection unit 14 as the captured image is being generated.

Figure 15B:
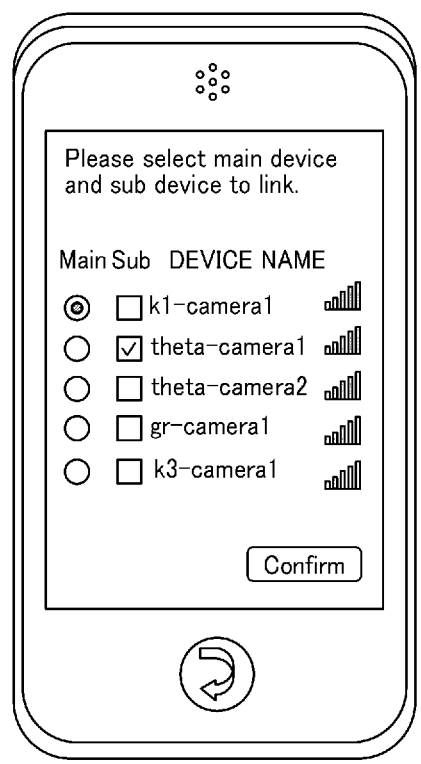

As illustrated in FIG. 19, the acceptance unit 52 of the smart phone 5 accepts a user instruction to start linked image capturing (S11). In response to the user instruction to start linked image capturing, the display control 56 controls the display 517 to display a linked image capturing device configuration screen as illustrated in FIG. 15B. The screen of FIG. 15B includes, for each image capturing device available for use, a radio button to be selected when the image capturing device is selected as a main device, and a check box to be selected when the image capturing device is selected as a sub device. The screen of FIG. 15B further displays, for each image capturing device available for use, a device name and a received signal intensity level of the image capturing device. Assuming that the user selects one image capturing device as a main device, and other image capturing device as a sub device, and presses the "Confirm" key, the acceptance unit 52 of the smart phone 5 accepts the instruction for starting linked image capturing. In this example, more than one image capturing device may be selected as the sub device. For this reasons, more than one check boxes may be selected.

The near-distance communication unit 58 of the smart phone 5 sends a polling inquiry to start image capturing, to the near-distance communication unit 38 of the generic image capturing device 3 (S12). The near-distance communication unit 38 of the generic image capturing device 3 receives the inquiry to start image capturing.

The determiner 37 of the generic image capturing device 3 determines whether image capturing has started, according to whether the acceptance unit 32 has accepted pressing of the shutter button 315a by the user (S13).

The near-distance communication unit 38 of the generic image capturing device 3 transmits a response based on a result of the determination at S13, to the smart phone 5 (S14). When it is determined that image capturing has started at S13, the response indicates that image capturing has started. In such case, the response includes an image identifier of the image being captured with the generic image capturing device 3. In contrary, when it is determined that the image capturing has not started at S13, the response indicates that it is waiting to start image capturing. The near-distance communication unit 58 of the smart phone 5 receives the response.

The description continues, assuming that the determination indicates that image capturing has started at S13 and the response indicating that image capturing has started is transmitted at S14.

The generic image capturing device 3 starts capturing the image (S15). The processing of S15, which is performed after pressing of the shutter button 315a, includes capturing the object and surroundings to generate captured image data (planar image data) with the image capturing unit 33, and storing the captured image data in the memory 3000 with the storing and reading unit 39.

At the smart phone 5, the near-distance communication unit 58 transmits an image capturing start request, which requests to start image capturing, to the special image capturing device 1 (S16). The near-distance communication unit 18 of the special image capturing device 1 receives the image capturing start request.

The special image capturing device 1 starts capturing the image (S17). Specifically, at S17, the image capturing unit 13 captures the object and surroundings to generate captured image data, i.e., two hemispherical images as illustrated in FIGS. 3A and 3B. The image and audio processing unit 15 then generates one equirectangular projection image as illustrated in FIG. 3C, based on these two hemispherical images. The storing and reading unit 19 stores data of the equirectangular projection image in the memory 1000.

At the smart phone 5, the near-distance communication unit 58 transmits a request to transmit a captured image ("captured image request") to the generic image capturing device 3 (S18). The captured image request includes the image identifier received at S14. The near-distance communication unit 38 of the generic image capturing device 3 receives the captured image request.

The near-distance communication unit 38 of the generic image capturing device 3 transmits planar image data, obtained at S15, to the smart phone 5 (S19). With the planar image data, the image identifier for identifying the planar image data, and attribute data, are transmitted. The image identifier and attribute data of the planar image, are a part of planar image information illustrated in FIG. 17. The near-distance communication unit 58 of the smart phone 5 receives the planar image data, the image identifier, and the attribute data.

The near-distance communication unit 18 of the special image capturing device 1 transmits the equirectangular projection image data, obtained at S17, to the smart phone 5 (S20). With the equirectangular projection image data, the image identifier for identifying the equirectangular projection image data, and attribute data, are transmitted. As illustrated in FIG. 17, the image identifier and the attribute data are a part of the equirectangular projection image information. The near-distance communication unit 58 of the smart phone 5 receives the equirectangular projection image data, the image identifier, and the attribute data.

Next, the storing and reading unit 59 of the smart phone 5 stores the planar image data received at S19, and the equirectangular projection image data received at S20, in the same folder in the memory 5000 (S21).

Next, the image and audio processing unit 55 of the smart phone 5 generates superimposed display metadata, which is used to display an image where the planar image P is partly superimposed on the spherical image CE (S22). Here, the planar image P is a high-definition image, and the spherical image CE is a low-definition image. The storing and reading unit 59 stores the superimposed display metadata in the memory 5000.

Referring to FIGS. 20 to 24, operation of generating superimposed display metadata is described in detail, according to the embodiment. Even when the generic image capturing device 3 and the special image capturing device 1 are equal in resolution of imaging element, the imaging element of the special image capturing device 1 captures a wide area to obtain the equirectangular projection image, from which the 360-degree spherical image CE is generated. Accordingly, the image data captured with the special image capturing device 1 tends to be low in definition per unit area.

<Generation of Superimposed Display Metadata>

First, operation of generating the superimposed display metadata is described. The superimposed display metadata is used to display an image on the display 517, where the high-definition planar image P is superimposed on the spherical image CE. The spherical image CE is generated from the low-definition equirectangular projection image EC. As illustrated in FIG. 17, the superimposed display metadata includes the location parameter and the correction parameter, each of which is generated as described below.

Referring to FIG. 20, the extractor 550 extracts a plurality of feature points fp1 from the rectangular, equirectangular projection image EC captured in equirectangular projection (S110). The extractor 550 further extracts a plurality of feature points fp2 from the rectangular, planar image P captured in perspective projection (S110).

Next, the first area calculator 552 calculates a rectangular, first area CA1 in the equirectangular projection image EC, which corresponds to the planar image P, based on similarity between the feature value fv1 of the feature 8 points fp1 in the equirectangular projection image EC, and the feature value fv2 of the feature points fp2 in the planar image P, using the homography (S120). More specifically, the first area calculator 552 calculates a rectangular, first area CA1 in the equirectangular projection image EC, which corresponds to the planar image P, based on similarity between the feature value fv1 of the feature points fp1 in the equirectangular projection image EC, and the feature value fv2 of the feature points fp2 in the planar image P, using the homography (S120). The above-described processing is performed to roughly estimate corresponding pixel (gird) positions between the planar image P and the equirectangular projection image EC that differ in projection.

Next, the point of gaze specifier 554 specifies the point (referred to as the point of gaze) in the equirectangular projection image EC, which corresponds to the central point CP1 of the planar image P after the first homography transformation (S130).

The projection converter 556 extracts a peripheral area PA, which is a part surrounding the point of gaze GP1, from the equirectangular projection image EC. The projection converter 556 converts the peripheral area PA, from the equirectangular projection to the perspective projection, to generate a peripheral area image PI (S140).

The extractor 550 extracts a plurality of feature points fp3 from the peripheral area image PI, which is obtained by the projection converter 556 (S150).

Next, the second area calculator 558 calculates a rectangular, second area CA2 in the peripheral area image PI, which corresponds to the planar image P, based on similarity between the feature value fv2 of the feature points fp2 in the planar image P, and the feature value fv3 of the feature points fp3 in the peripheral area image PI using second homography (S160). In this example, the planar image P, which is a high-definition image of 40 million pixels, may be reduced in size.

Next, the area divider 560 divides the second area CA2 into a plurality of grid areas LA2 as illustrated in FIG. 22B (S170).

As illustrated in FIG. 20, the projection reverse converter 562 converts (reverse converts) the second area CA2 from the perspective projection to the equirectangular projection, which is the same as the projection of the equirectangular projection image EC (S180). As illustrated in FIG. 23, the projection reverse converter 562 determines the third area CA3 in the equirectangular projection image EC, which contains a plurality of grid areas LA3 corresponding to the plurality of grid areas LA2 in the second area CA2. FIG. 23 is a conceptual diagram for explaining determination of the third area CA3 in the equirectangular projection image EC. Through processing by the projection reverse converter 562, a location parameter is generated, which indicates the coordinate of each grid in each grid area LA3. The location parameter is illustrated in FIG. 17 and FIG. 18B.

Figure 24B:
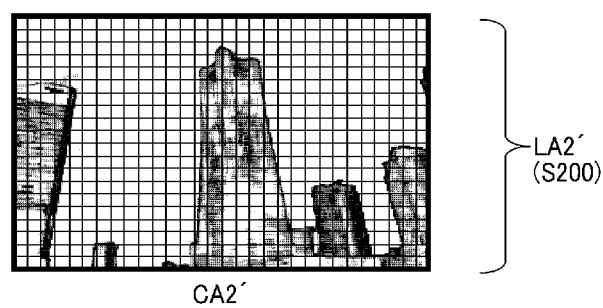
Figure 24C:
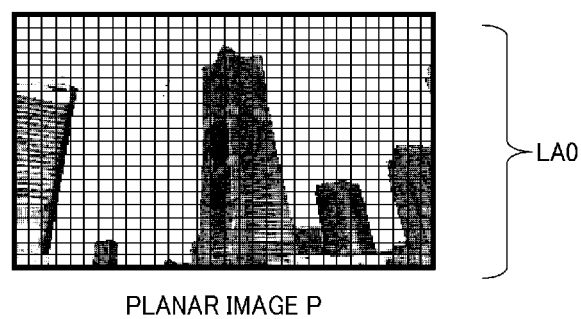

Referring to FIGS. 20 to 24C, operation of generating the correction parameter is described according to the embodiment. FIGS. 24A to 24C are conceptual diagrams illustrating operation of generating the correction parameter, according to the embodiment.

After S180, the shape converter 564 converts the second area CA2 to have a shape that is the same as the shape of the planar image P. Specifically, the shape converter 564 maps four vertices of the second area CA2, illustrated in FIG. 24A, on corresponding four vertices of the planar image P, to obtain the second area CA2 as illustrated in FIG. 24B.

As illustrated in FIG. 24C, the area divider 560 divides the planar image P into a plurality of grid areas LA0, which are equal in shape and number to the plurality of grid areas LA2' of the second area CA2' (S200).

The correction parameter generator 566 generates the correction parameter, which is to be applied to each grid area LA2' in the second area CA2', such that each grid area LA2' is equal to the corresponding grid area LA0 in the planar image P in brightness and color (S210).

As illustrated in FIG. 17, the superimposed display metadata generator 570 generates the superimposed display metadata, using the equirectangular projection image information obtained from the special image capturing device 1, the planar image information obtained from the generic image capturing device 3, the area division number information previously set, the location parameter generated by the projection reverse converter 562, the correction parameter generated by the correction parameter generator 566, and the metadata generation information (S220). The superimposed display metadata is stored in the memory 5000 by the storing and reading unit 59.

Then, the operation of generating the superimposed display metadata performed at S22 of FIG. 19 ends. The display control 56, which cooperates with the storing and reading unit 59, superimposes the images, using the superimposed display metadata (S23).

<Superimposition>
Referring to FIGS. 25 to 30D, operation of superimposing images is described according to the embodiment. FIG. 25 is a conceptual diagram illustrating operation of superimposing images, with images being processed or generated, according to the embodiment.

The storing and reading unit 59 (obtainer) illustrated in FIG. 14 reads from the memory 5000, data of the equirectangular projection image EC in equirectangular projection, data of the planar image P in perspective projection, and the superimposed display metadata.

As illustrated in FIG. 25, using the location parameter, the superimposed area generator 582 specifies a part of the virtual sphere CS, which corresponds to the third area CA3, to generate a partial sphere PS (S310). The pixels other than the pixels corresponding to the grids having the positions defined by the location parameter are interpolated by linear interpolation.

The correction unit 584 corrects the brightness and color of the planar image P, using the correction parameter of the superimposed display metadata, to match the brightness and color of the equirectangular projection image EC (S320). The planar image P, which has been corrected, is referred to as the "corrected planar image C".

The image generator 586 superimposes the corrected planar image C of the planar image P, on the partial sphere PS to generate the superimposed image S (S330). The pixels other than the pixels corresponding to the grids having the positions defined by the location parameter are interpolated by linear interpolation. The image generator 586 generates mask data M based on the partial sphere PS (S340). The image generator 586 covers (attaches) the equirectangular projection image EC, over a surface of the sphere CS, to generate the spherical image CE (S350). The image superimposing unit 588 superimposes the superimposed image S and the mask data M, on the spherical image CE (S360). The image is generated, in which the high-definition superimposed image S is superimposed on the low-definition spherical image CE. With the mask data, the boundary between the two different images is made unnoticeable.

As illustrated in FIG. 7, the projection converter 590 converts projection, such that the predetermined area T of the spherical image CE, with the superimposed image S being superimposed, is displayed on the display 517, for example, in response to a user instruction for display. The projection transformation is performed based on the line of sight of the user (the direction of the virtual camera IC, represented by the central point CP of the predetermined area T), and the angle of view α of the predetermined area T (S370). The projection converter 590 may further change a size of the predetermined area T according to the resolution of the display area of the display 517. Accordingly, the display control 56 displays the predetermined-area image Q, that is, the image of the predetermined area T, in the entire display area of the display 517 (S24). In this example, the predetermined-area image Q includes the superimposed image S superimposed with the planar image P.

Figure 26:
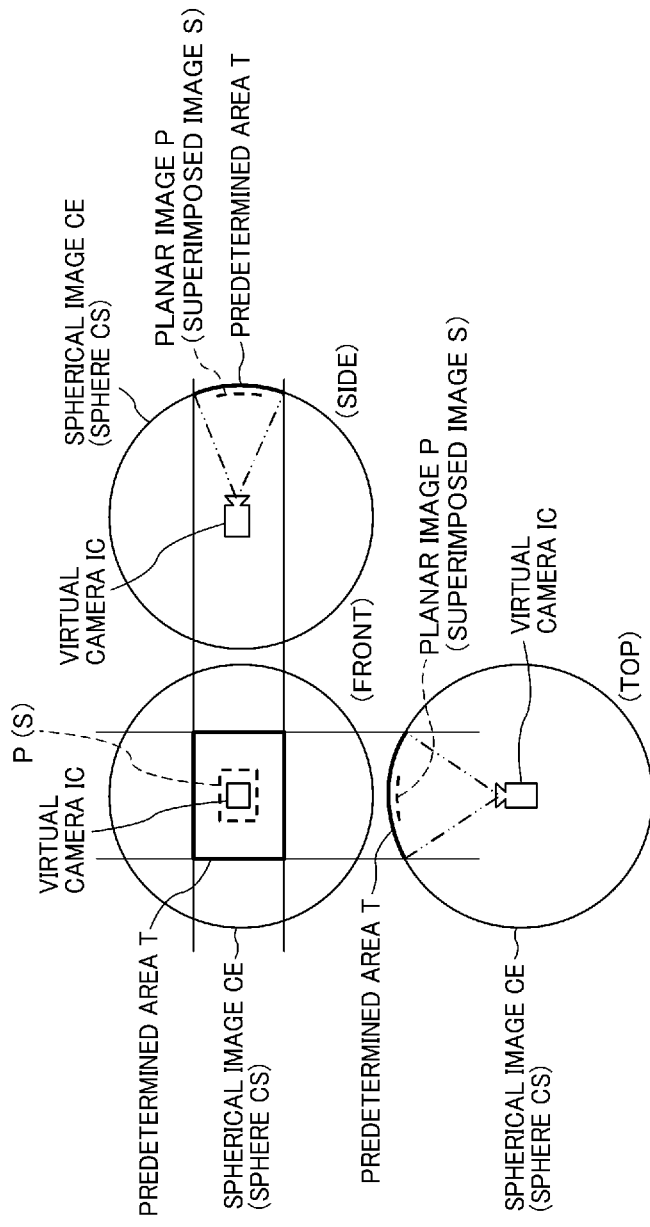
FIG. 26 is a conceptual diagram illustrating a two-dimensional view of the spherical image superimposed with the planar image, according to the first embodiment.

Referring to FIGS. 26 to 30D, display of the superimposed image is described in detail, according to the embodiment. FIG. 26 is a conceptual diagram illustrating a two-dimensional view of the spherical image CE superimposed with the planar image P. The planar image P is superimposed on the spherical image CE illustrated in FIG. 5. As illustrated in FIG. 26, the high-definition superimposed image S is superimposed on the spherical image CE, which covers a surface of the sphere CS, to be within the inner side of the sphere CS, according to the location parameter.

Figure 27:
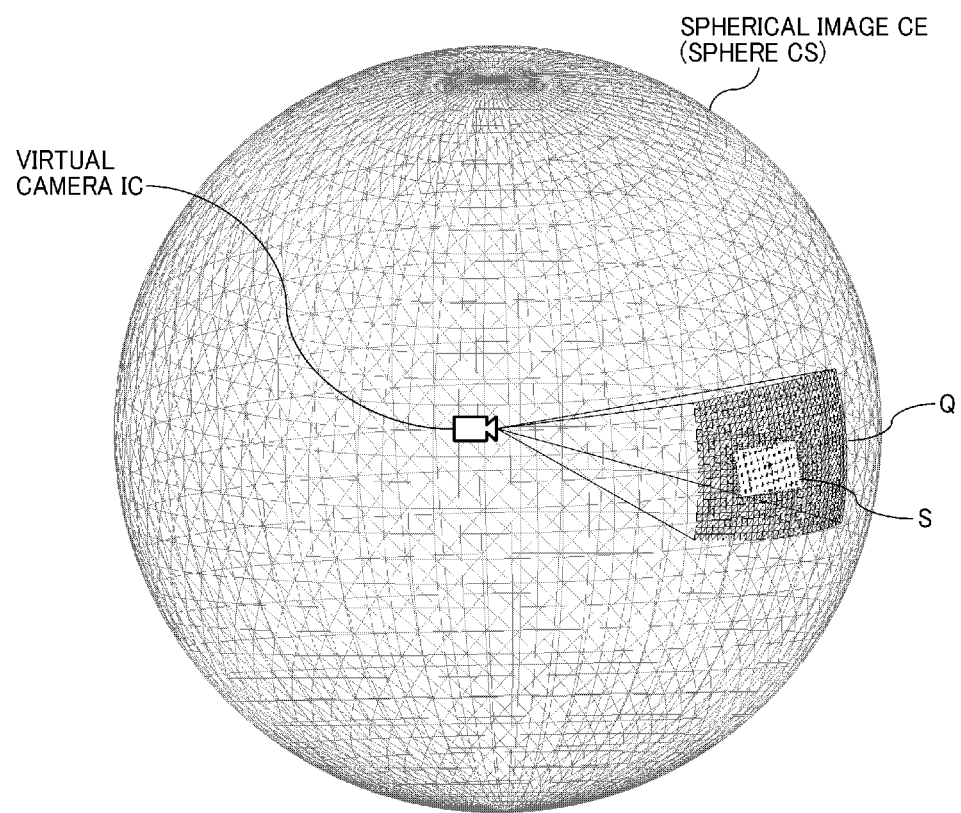
FIG. 27 is a conceptual diagram illustrating a three-dimensional view of the spherical image superimposed with the planar image, according to the first embodiment.

FIG. 27 is a conceptual diagram illustrating a three-dimensional view of the spherical image CE superimposed with the planar image P. FIG. 27 represents a state in which the spherical image CE and the superimposed image S cover a surface of the sphere CS, and the predetermined-area image Q includes the superimposed image S.

Figure 28A:
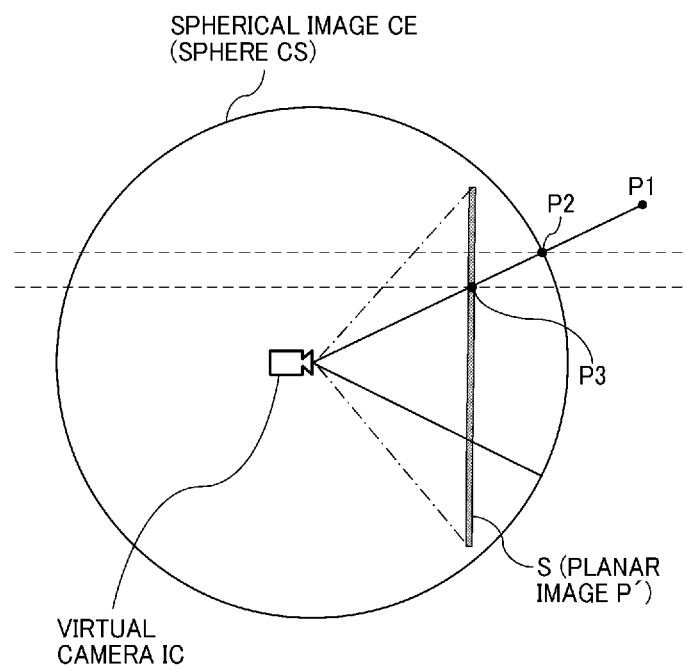
FIGS. 28A and 28B are conceptual diagrams illustrating a two-dimensional view of a spherical image superimposed with a planar image, without using the location parameter, according to a comparative example.
Figure 28B:
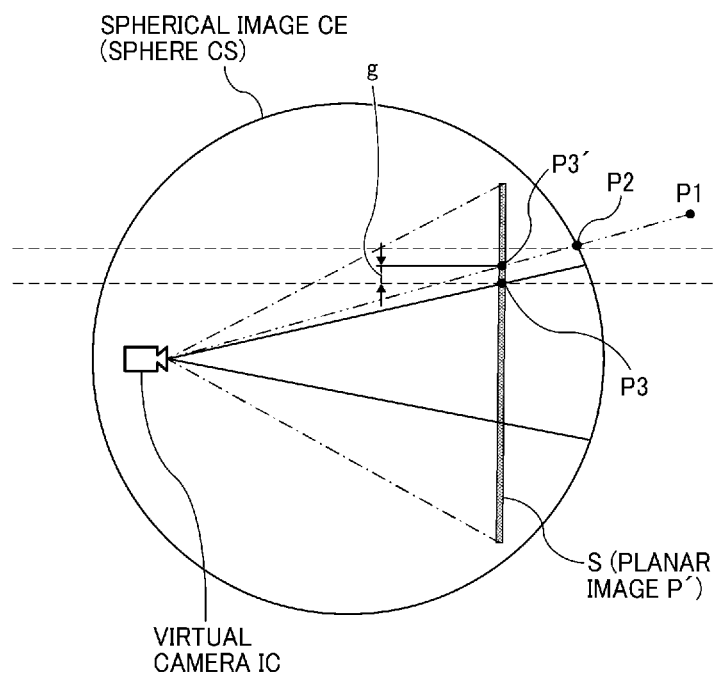
Figure 29A:
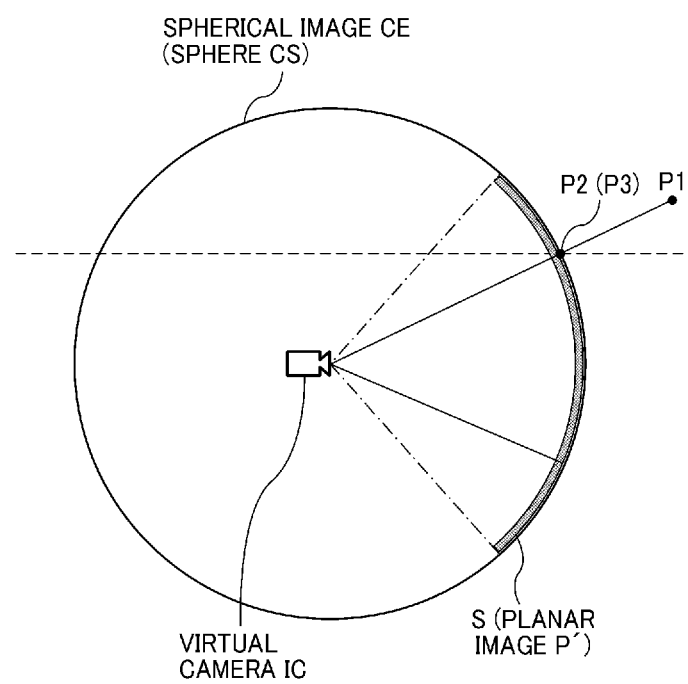
FIGS. 29A and 29B are conceptual diagrams illustrating a two-dimensional view of the spherical image superimposed with the planar image, using the location parameter, in the first embodiment.
Figure 29B:
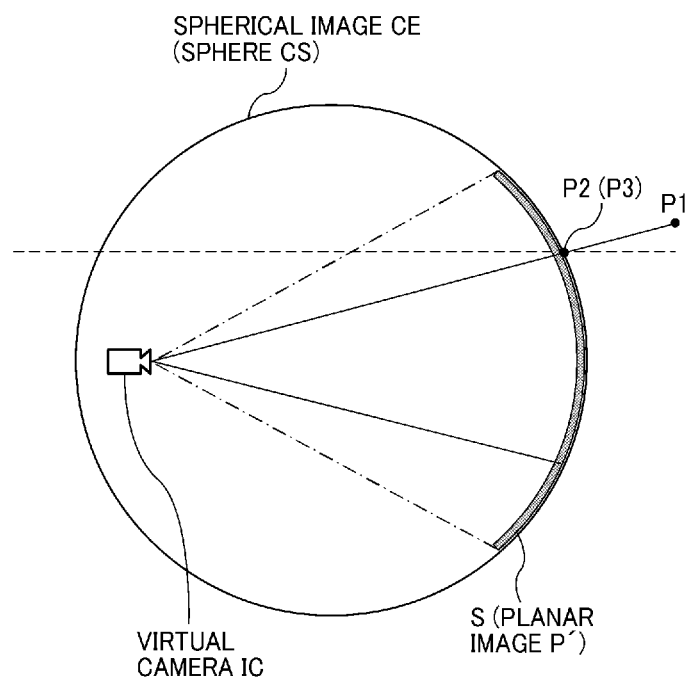

FIGS. 28A and 28B are conceptual diagrams illustrating a two-dimensional view of a spherical image superimposed with a planar image, without using the location parameter, according to a comparative example. FIGS. 29A and 29B are conceptual diagrams illustrating a two-dimensional view of the spherical image CE superimposed with the planar image P, using the location parameter, in this embodiment.

As illustrated in FIG. 28A, it is assumed that the virtual camera IC, which corresponds to the user's point of view, is located at the center of the sphere CS, which is a reference point. The object P1, as an image capturing target, is represented by the object P2 in the spherical image CE. The object P1 is represented by the object P3 in the superimposed image S. Still referring to FIG. 28A, the object P2 and the object P3 are positioned along a straight line connecting the virtual camera IC and the object P1. This indicates that, even when the superimposed image S is displayed as being superimposed on the spherical image CE, the coordinate of the spherical image CE and the coordinate of the superimposed image S match. As illustrated in FIG. 28B, if the virtual camera IC is moved away from the center of the sphere CS, the position of the object P2 stays on the straight line connecting the virtual camera IC and the object P1, but the position of the object P3 is slightly shifted to the position of an object P3'. The object P3' is an object in the superimposed image S, which is positioned along the straight line connecting the virtual camera IC and the object P1. This will cause a difference in grid positions between the spherical image CE and the superimposed image S, by an amount of shift "g" between the object P3 and the object P3'. Accordingly, in displaying the superimposed image S, the coordinate of the superimposed image S is shifted from the coordinate of the spherical image CE.

In view of the above, in this embodiment, the location parameter is generated, which indicates respective positions of a plurality of grid areas in the superimposed image S with respect to the planar image P. With this location parameter, as illustrated in FIGS. 29A and 29B, the superimposed image S is superimposed on the spherical image CE at right positions, while compensating the shift. More specifically, as illustrated in FIG. 29A, when the virtual camera IC is at the center of the sphere CS, the object P2 and the object P3 are positioned along the straight line connecting the virtual camera IC and the object P1. As illustrated in FIG. 29B, even when the virtual camera IC is moved away from the center of the sphere CS, the object P2 and the object P3 are positioned along the straight line connecting the virtual camera IC and the object P1. Even when the superimposed image S is displayed as being superimposed on the spherical image CE, the coordinate of the spherical image CE and the coordinate of the superimposed image S match.

Figure 30A:
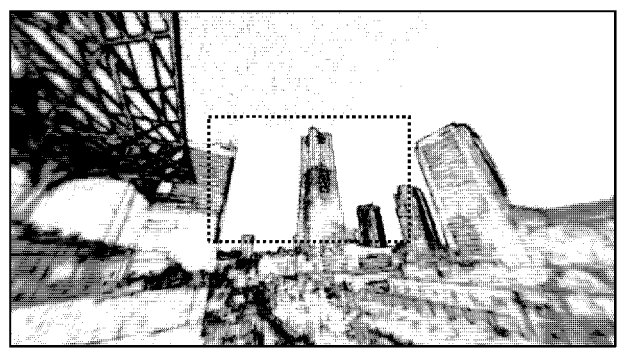
FIGS. 30A, 30B, 30C, and 30D are illustrations of a wide-angle image without superimposed display, a telephoto image without superimposed display, a wide-angle image with superimposed display, and a telephoto image with superimposed display, according to the first embodiment.
Figure 30B:
Figure 30C:
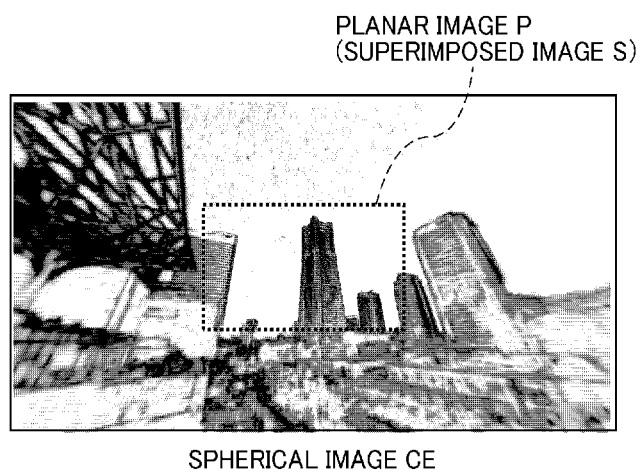
Figure 30D:
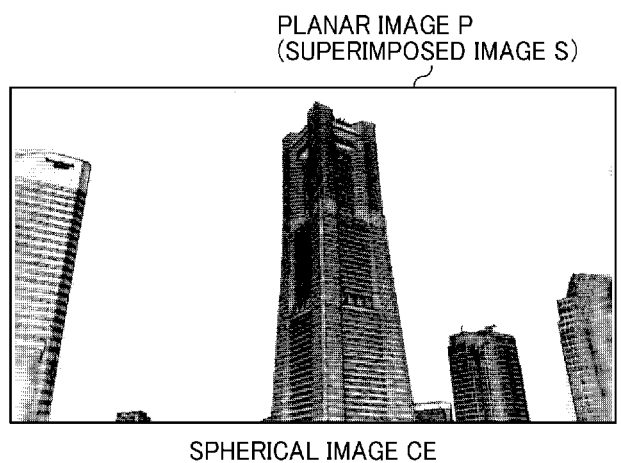

Accordingly, the image capturing system of this embodiment is able to display an image in which the high-definition planar image P is superimposed on the low-definition spherical image CE, with high image quality. This will be explained referring to FIGS. 30A to 30D. FIG. 30A illustrates the spherical image CE, when displayed as a wide-angle image. Here, the planar image P is not superimposed on the spherical image CE. FIG. 30B illustrates the spherical image CE, when displayed as a telephoto image. Here, the planar image P is not superimposed on the spherical image CE. FIG. 30C illustrates the spherical image CE, superimposed with the planar image P, when displayed as a wide-angle image. FIG. 30D illustrates the spherical image CE, superimposed with the planar image P, when displayed as a telephoto image. The dotted line in each of FIGS. 30A and 30C, which indicates the boundary of the planar image P, is shown for the descriptive purposes. Such dotted line may be displayed, or not displayed, on the display 517 to the user.

It is assumed that, while the spherical image CE without the planar image P being superimposed, is displayed as illustrated in FIG. 30A, a user instruction for enlarging an area indicated by the dotted area is received. In such case, as illustrated in FIG. 30B, the enlarged, low-definition image, which is a blurred image, is displayed to the user. As described above in this embodiment, it is assumed that, while the spherical image CE with the planar image P being superimposed, is displayed as illustrated in FIG. 30C, a user instruction for enlarging an area indicated by the dotted area is received. In such case, as illustrated in FIG. 30D, a high-definition image, which is a clear image, is displayed to the user. For example, assuming that the target object, which is shown within the dotted line, has a sign with some characters, even when the user enlarges that section, the user may not be able to read such characters if the image is blurred. If the high-definition planar image P is superimposed on that section, the high-quality image will be displayed to the user such that the user is able to read those characters.

As described above in this embodiment, even when images that differ in projection are superimposed one above the other, the grid shift caused by the difference in projection can be compensated. For example, even when the planar image P in perspective projection is superimposed on the equirectangular projection image EC in equirectangular projection, these images are displayed with the same coordinate positions. More specifically, the special image capturing device 1 and the generic image capturing device 3 capture images using different projection methods. In such case, if the planar image P obtained by the generic image capturing device 3, is superimposed on the spherical image CE that is generated from the equirectangular projection image EC obtained by the special image capturing device, the planar image P does not fit in the spherical image CE as these images CE and P look different from each other. In view of this, as illustrated in FIG. 20, the smart phone 5 according to this embodiment determines the first area CA1 in the equirectangular projection image EC, which corresponds to the planar image P, to roughly determine the area where the planar image P is superimposed (S120). The smart phone 5 extracts a peripheral area PA, which is a part surrounding the point of gaze GP1 in the first area CA1, from the equirectangular projection image EC. The smart phone 5 further converts the peripheral area PA, from the equirectangular projection, to the perspective projection that is the projection of the planar image P, to generate a peripheral area image PI (S140). The smart phone 5 determines the second area CA2, which corresponds to the planar image P, in the peripheral area image PI (S160), and reversely converts the projection applied to the second area CA2, back to the equirectangular projection applied to the equirectangular projection image EC. With this projection transformation, the third area CA3 in the equirectangular projection image EC, which corresponds to the second area CA2, is determined (S180). As illustrated in FIG. 30C, the high-definition planar image P is superimposed on a part of the predetermined-area image on the low-definition, spherical image CE. The planar image P fits in the spherical image CE, when displayed to the user.

Further, in this embodiment, the location parameter indicates positions where the superimposed image S is superimposed on the spherical image CE, using the third area CA3 including a plurality of grid areas. Accordingly, as illustrated in FIG. 29B, the superimposed image S is superimposed on the spherical image CE at right positions. This compensates the shift in grid due to the difference in projection, even when the position of the virtual camera IC changes.

Second Embodiment

Referring now to FIGS. 31 to 35, an image capturing system is described according to a second embodiment.

<Overview of Image Capturing System>

Figure 31:
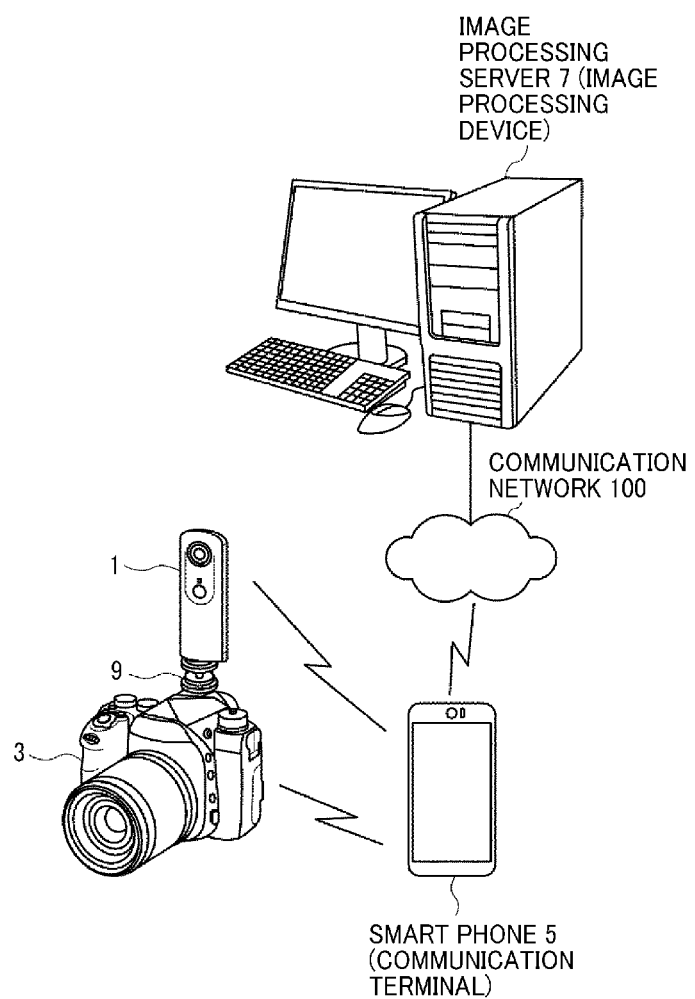
FIG. 31 is a schematic view illustrating an image capturing system according to a second embodiment.

First, referring to FIG. 31, an overview of the image capturing system is described according to the second embodiment. FIG. 31 is a schematic block diagram illustrating a configuration of the image capturing system according to the second embodiment.

As illustrated in FIG. 31, compared to the image capturing system of the first embodiment described above, the image capturing system of this embodiment further includes an image processing server 7. In the second embodiment, the elements that are substantially same to the elements described in the first embodiment are assigned with the same reference numerals. For descriptive purposes, description thereof is omitted. The smart phone 5 and the image processing server 7 communicate with each other through the communication network 100 such as the Internet and the Intranet.

In the first embodiment, the smart phone 5 generates superimposed display metadata, and processes superimposition of images. In this second embodiment, the image processing server 7 performs such processing, instead of the smart phone 5. The smart phone 5 in this embodiment is one example of the communication terminal, and the image processing server 7 is one example of the image processing apparatus or device.

The image processing server 7 is a server system, which is implemented by a plurality of computers that may be distributed over the network to perform processing such as image processing in cooperation with one another.

<Hardware Configuration>

Figure 32:
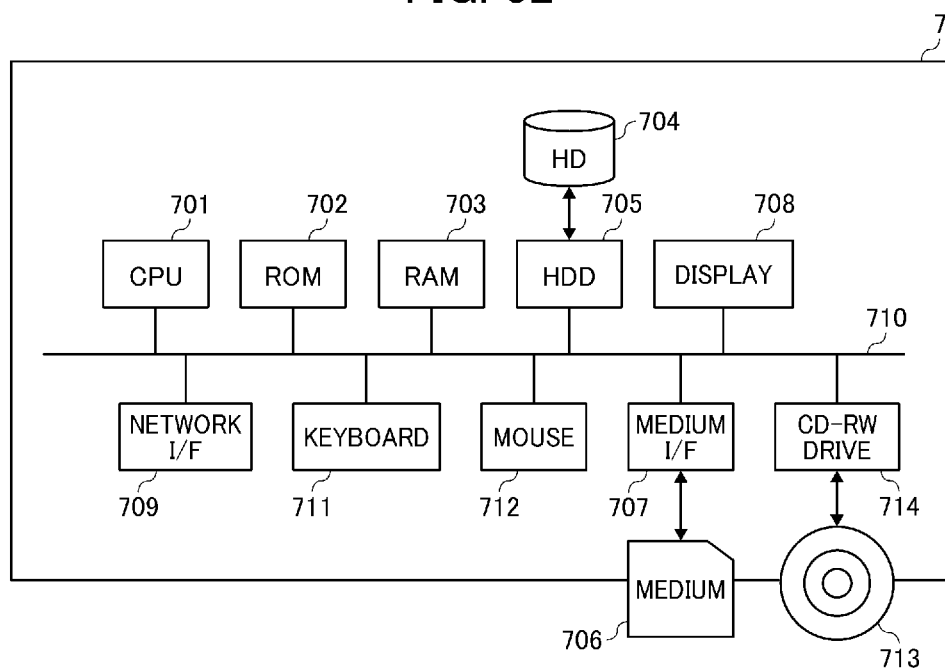
FIG. 32 is a schematic diagram illustrating a hardware configuration of an image processing server according to the second embodiment.

Next, referring to FIG. 32, a hardware configuration of the image processing server 7 is described according to the embodiment. FIG. 32 illustrates a hardware configuration of the image processing server 7 according to the embodiment. Since the special image capturing device 1, the generic image capturing device 3, and the smart phone 5 are substantially the same in hardware configuration, as described in the first embodiment, description thereof is omitted.

<Hardware Configuration of Image Processing Server>

FIG. 32 is a schematic block diagram illustrating a hardware configuration of the image processing server 7, according to the embodiment. Referring to FIG. 32, the image processing server 7, which is implemented by the general-purpose computer, includes a CPU 701, a ROM 702, a RAM 703, a HD 704, a HDD 705, a medium I/F 707, a display 708, a network I/F 709, a keyboard 711, a mouse 712, a CD-RW drive 714, and a bus line 710. Since the image processing server 7 operates as a server, an input device such as the keyboard 711 and the mouse 712, or an output device such as the display 708 does not have to be provided.

The CPU 701 controls entire operation of the image processing server 7. The ROM 702 stores a control program for controlling the CPU 701. The RAM 703 is used as a work area for the CPU 701. The HD 704 stores various data such as programs. The HDD 705 controls reading or writing of various data to or from the HD 704 under control of the CPU 701. The medium I/F 707 controls reading or writing of data with respect to a recording medium 706 such as a flash memory. The display 708 displays various information such as a cursor, menu, window, characters, or image. The network I/F 709 is an interface that controls communication of data with an external device through the communication network 100. The keyboard 711 is one example of input device provided with a plurality of keys for allowing a user to input characters, numerals, or various instructions. The mouse 712 is one example of input device for allowing the user to select a specific instruction or execution, select a target for processing, or move a curser being displayed. The CD-RW drive 714 reads or writes various data with respect to a Compact Disc ReWritable (CD-RW) 713, which is one example of removable recording medium.

The image processing server 7 further includes the bus line 710. The bus line 710 is an address bus or a data bus, which electrically connects the elements in FIG. 32 such as the CPU 701.

<Functional Configuration of Image Capturing System>

Figure 33:
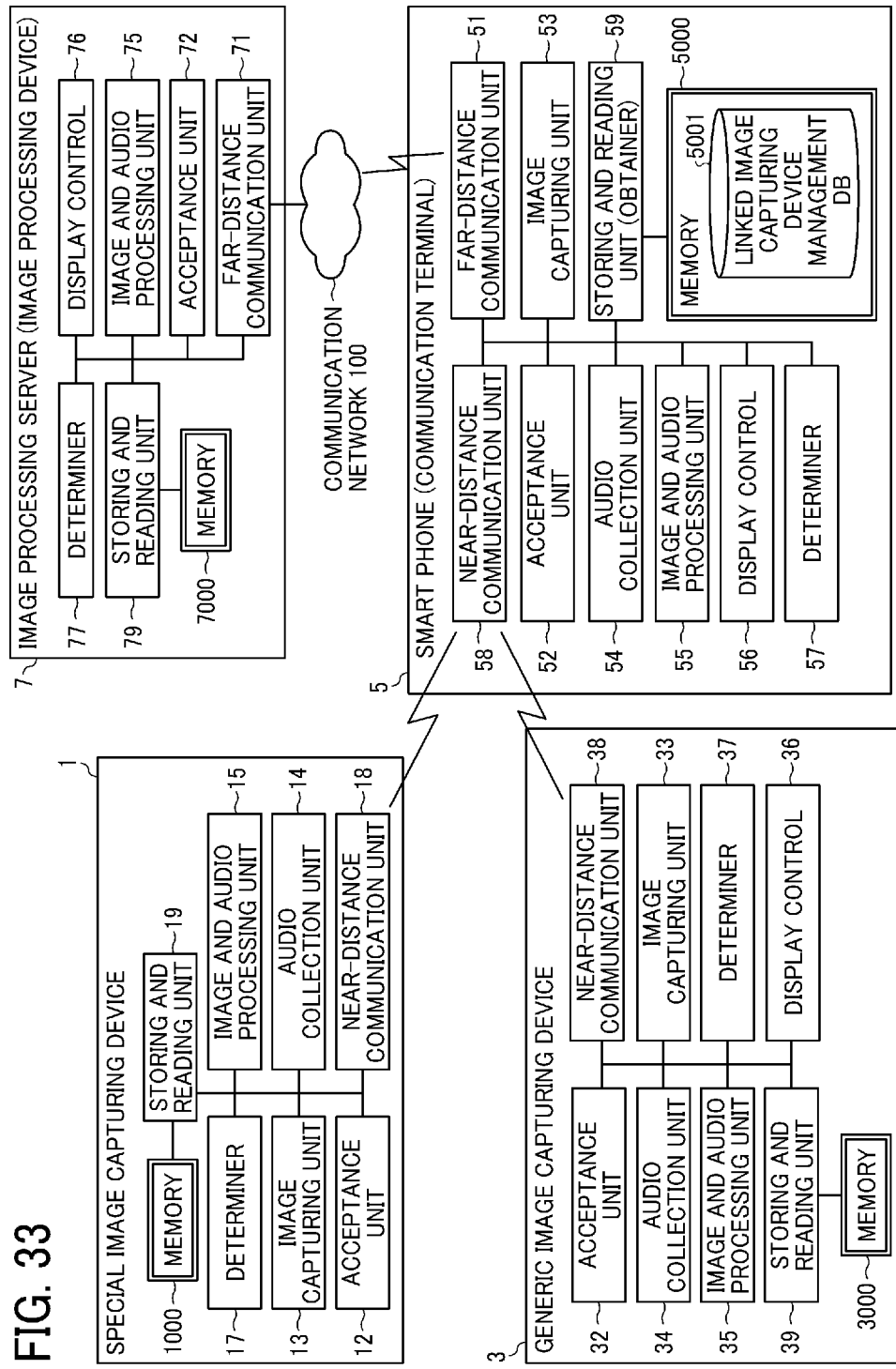
FIG. 33 is a schematic block diagram illustrating a functional configuration of the image capturing system of FIG. 31 according to the second embodiment.
Figure 34:
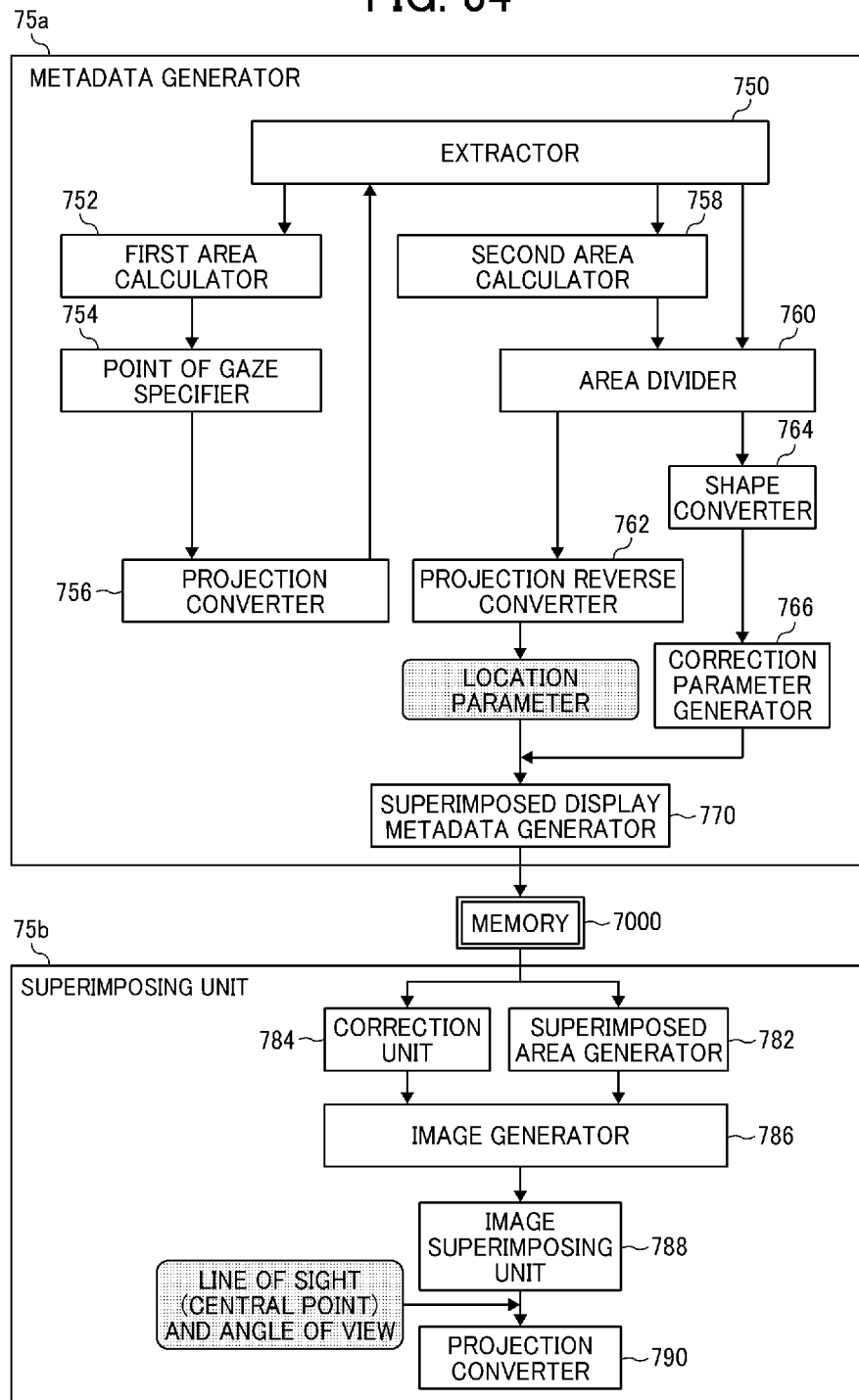
FIG. 34 is a block diagram illustrating a functional configuration of an image and audio processing unit according to the second embodiment.

Referring now to FIGS. 33 and 34, a functional configuration of the image capturing system of FIG. 31 is described according to the second embodiment. FIG. 33 is a schematic block diagram illustrating a functional configuration of the image capturing system of FIG. 31 according to the second embodiment. Since the special image capturing device 1, the generic image capturing device 3, and the smart phone 5 are substantially same in functional configuration, as described in the first embodiment, description thereof is omitted. In this embodiment, however, the image and audio processing unit 55 of the smart phone 5 does not have to be provided with all of the functional units illustrated in FIG. 16.

<Functional Configuration of Image Processing Server>

As illustrated in FIG. 33, the image processing server 7 includes a far-distance communication unit 71, an acceptance unit 72, an image and audio processing unit 75, a display control 76, a determiner 77, and a storing and reading unit 79. These units are functions that are implemented by or that are caused to function by operating any of the elements illustrated in FIG. 32 in cooperation with the instructions of the CPU 701 according to the control program expanded from the HD 704 to the RAM 703.

The image processing server 7 further includes a memory 7000, which is implemented by the ROM 702, the RAM 703 and the HD 704 illustrated in FIG. 32.

The far-distance communication unit 71 of the image processing server 7 is implemented by the network I/F 709 that operates under control of the CPU 701, illustrated in FIG. 32, to transmit or receive various data or information to or from other device (for example, other smart phone or server) through the communication network such as the Internet.

The acceptance unit 72 is implement by the keyboard 711 or mouse 712, which operates under control of the CPU 701, to receive various selections or inputs from the user.

The image and audio processing unit 75 is implemented by the instructions of the CPU 701. The image and audio processing unit 75 applies various types of processing to various types of data, transmitted from the smart phone 5.

The display control 76, which is implemented by the instructions of the CPU 701, generates data of the predetermined-area image Q, as a part of the planar image P, for display on the display 517 of the smart phone 5. The display control 76 superimposes the planar image P, on the spherical image CE, using superimposed display metadata, generated by the image and audio processing unit 75. With the superimposed display metadata, each grid area LA0 of the planar image P is placed at a location indicated by a location parameter, and is adjusted to have a brightness value and a color value indicated by a correction parameter.

The determiner 77 is implemented by the instructions of the CPU 701, illustrated in FIG. 32, to perform various determinations.

The storing and reading unit 79, which is implemented by instructions of the CPU 701 illustrated in FIG. 32, stores various data or information in the memory 7000 and read out various data or information from the memory 7000. For example, the superimposed display metadata may be stored in the memory 7000. In this embodiment, the storing and reading unit 79 functions as an obtainer that obtains various data from the memory 7000.

(Functional Configuration of Image and Audio Processing Unit)

Referring to FIG. 34, a functional configuration of the image and audio processing unit 75 is described according to the embodiment. FIG. 34 is a block diagram illustrating the functional configuration of the image and audio processing unit 75 according to the embodiment.

Figure 35:
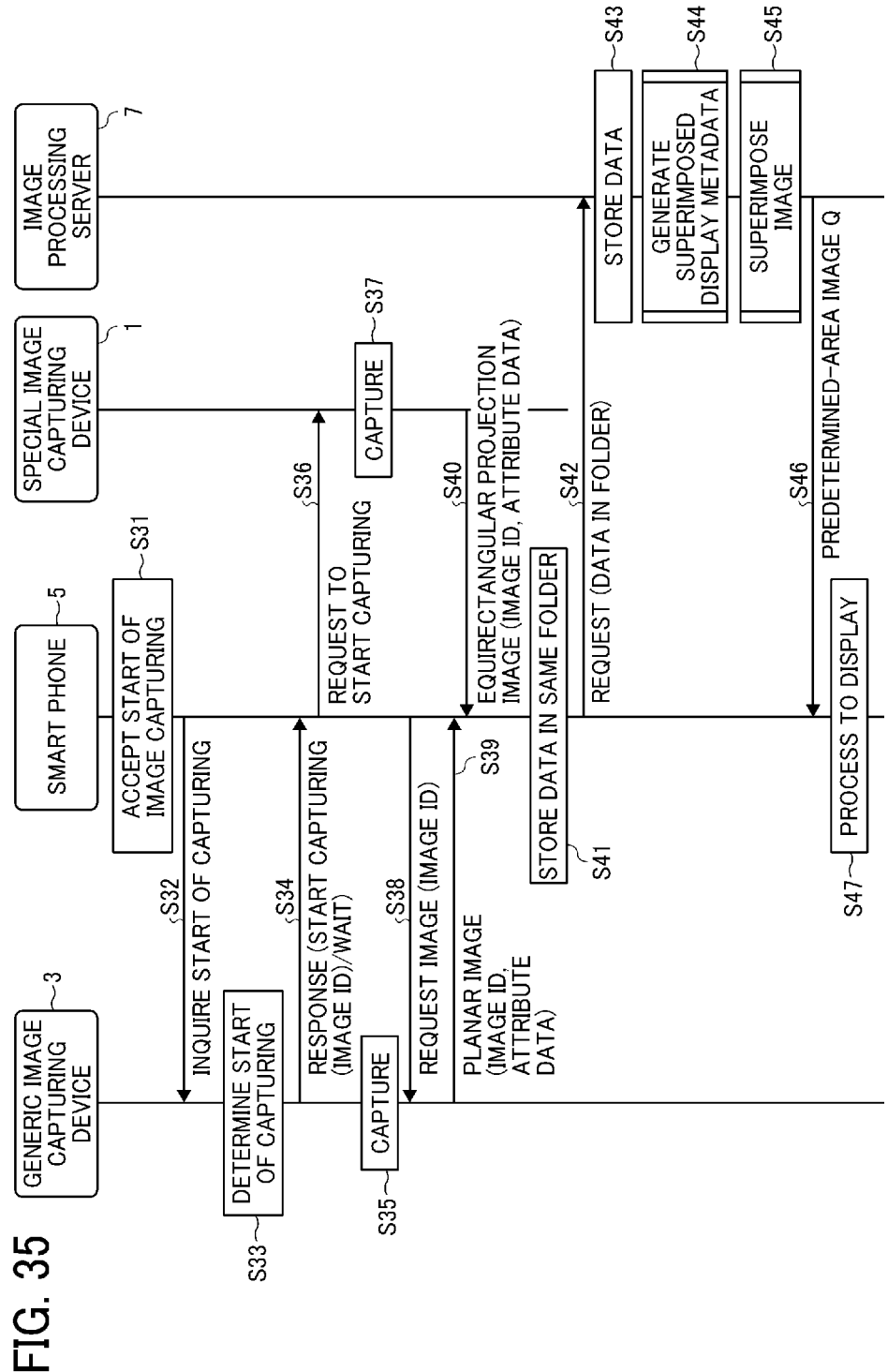
FIG. 35 is a data sequence diagram illustrating operation of capturing the image, performed by the image capturing system, according to the second embodiment.

The image and audio processing unit 75 mainly includes a metadata generator 75a that performs encoding, and a superimposing unit 75b that performs decoding. The metadata generator 75a performs processing of S44, which is processing to generate superimposed display metadata, as illustrated in FIG. 35. The superimposing unit 75b performs processing of S45, which is processing to superimpose the images using the superimposed display metadata, as illustrated in FIG. 35.

(Functional Configuration of Metadata Generator)

First, a functional configuration of the metadata generator 75a is described according to the embodiment. The metadata generator 75a includes an extractor 750, a first area calculator 752, a point of gaze specifier 754, a projection converter 756, a second area calculator 758, an area divider 760, a projection reverse converter 762, a shape converter 764, a correction parameter generator 766, and a superimposed display metadata generator 770. These elements of the metadata generator 75a are substantially similar in function to the extractor 550, first area calculator 552, point of gaze specifier 554, projection converter 556, second area calculator 558, area divider 560, projection reverse converter 562, shape converter 564, correction parameter generator 566, and superimposed display metadata generator 570 of the metadata generator 55a, respectively. Accordingly, the description thereof is omitted.

Referring to FIG. 34, a functional configuration of the superimposing unit 75b is described according to the embodiment. The superimposing unit 75b includes a superimposed area generator 782, a correction unit 784, an image generator 786, an image superimposing unit 788, and a projection converter 790. These elements of the superimposing unit 75b are substantially similar in function to the superimposed area generator 582, correction unit 584, image generator 586, image superimposing unit 588, and projection converter 590 of the superimposing unit 55b, respectively. Accordingly, the description thereof is omitted.

<Operation>

Referring to FIG. 35, operation of capturing the image, performed by the image capturing system of FIG. 31, is described according to the second embodiment. Referring to FIG. 35, operation of capturing the image, performed by the image capturing system of FIG. 31, is described according to the second embodiment. FIG. 35 is a data sequence diagram illustrating operation of capturing the image, according to the second embodiment. S31 to S41 are performed in a substantially similar manner as described above referring to S11 to S21 according to the first embodiment, and description thereof is omitted.

At the smart phone 5, the far-distance communication unit 51 transmits a superimposing request, which requests for superimposing one image on other image that are different in projection, to the image processing server 7, through the communication network 100 (S42). The superimposing request includes image data to be processed, which has been stored in the memory 5000. In this example, the image data to be processed includes planar image data, and equirectangular projection image data, which are stored in the same folder. The far-distance communication unit 71 of the image processing server 7 receives the image data to be processed.

Next, at the image processing server 7, the storing and reading unit 79 stores the image data to be processed (planar image data and equirectangular projection image data), which is received at S42, in the memory 7000 (S43). The metadata generator 75a illustrated in FIG. 34 generates superimposed display metadata (S44). Further, the superimposing unit 75b superimposes images using the superimposed display metadata (S45). More specifically, the superimposing unit 75b superimposes the planar image on the equirectangular projection image. S44 and S45 are performed in a substantially similar manner as described above referring to S22 and S23 of FIG. 19, and description thereof is omitted.

Next, the display control 76 generates data of the predetermined-area image Q, which corresponds to the predetermined area T, to be displayed in a display area of the display 517 of the smart phone 5. As described above in this example, the predetermined-area image Q is displayed so as to cover the entire display area of the display 517. In this example, the predetermined-area image Q includes the superimposed image S superimposed with the planar image P. The far-distance communication unit 71 transmits data of the predetermined-area image Q, which is generated by the display control 76, to the smart phone 5 (S46). The far-distance communication unit 51 of the smart phone 5 receives the data of the predetermined-area image Q.

The display control 56 of the smart phone 5 controls the display 517 to display the predetermined-area image Q including the superimposed image S (S47).

Accordingly, the image capturing system of this embodiment can achieve the advantages described above referring to the first embodiment.

Further, in this embodiment, the smart phone 5 performs image capturing, and the image processing server 7 performs image processing such as generation of superimposed display metadata and generation of superimposed images. This results in decrease in processing load on the smart phone 5. Accordingly, high image processing capability is not required for the smart phone 5.

Any one of the above-described embodiments may be implemented in various other ways. For example, as illustrated in FIG. 14, the equirectangular projection image data, planar image data, and superimposed display metadata, may not be stored in a memory of the smart phone 5. For example, any of the equirectangular projection image data, planar image data, and superimposed display metadata may be stored in any server on the network.

In any of the above-described embodiments, the planar image P is superimposed on the spherical image CE. Alternatively, the planar image P to be superimposed may be replaced by a part of the spherical image CE. In another example, after deleting a part of the spherical image CE, the planar image P may be embedded in that part having no image.

Furthermore, in the second embodiment, the image processing server 7 performs superimposition of images (S45). For example, the image processing server 7 may transmit the superimposed display metadata to the smart phone 5, to instruct the smart phone 5 to perform superimposition of images and display the superimposed images. In such case, at the image processing server 7, the metadata generator 75a illustrated in FIG. 34 generates superimposed display metadata. At the smart phone 5, the superimposing unit 75b illustrated in FIG. 34 superimposes one image on other image, in a substantially similar manner in the case of the superimposing unit 55b in FIG. 16. The display control 56 illustrated in FIG. 14 processes display of the superimposed images.

In this disclosure, examples of superimposition of images include, but not limited to, placement of one image on top of other image entirely or partly, laying one image over other image entirely or partly, mapping one image on other image entirely or partly, pasting one image on other image entirely or partly, combining one image with other image, and integrating one image with other image. That is, as long as the user can perceive a plurality of images (such as the spherical image and the planar image) being displayed on a display as they were one image, processing to be performed on those images for display is not limited to the above-described examples.

The present invention can be implemented in any convenient form, for example using dedicated hardware, or a mixture of dedicated hardware and software. The present invention may be implemented as computer software implemented by one or more networked processing apparatuses. The processing apparatuses can compromise any suitably programmed apparatuses such as a general-purpose computer, personal digital assistant, mobile telephone (such as a WAP or 3G-compliant phone) and so on. Since the present invention can be implemented as software, each and every aspect of the present invention thus encompasses computer software implementable on a programmable device. The computer software can be provided to the programmable device using any conventional carrier medium such as a recording medium. The carrier medium can compromise a transient carrier medium such as an electrical, optical, microwave, acoustic or radio frequency signal carrying the computer code. An example of such a transient medium is a TCP/IP signal carrying computer code over an IP network, such as the Internet. The carrier medium can also comprise a storage medium for storing processor readable code such as a floppy disk, hard disk, CD ROM, magnetic tape device or solid state memory device.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), DSP (digital signal processor), FPGA (field programmable gate array) and conventional circuit components arranged to perform the recited functions.

In one embodiment, the present invention may reside in an image processing apparatus including circuitry to: obtain a first image in a first projection, and a second image in a second projection; transform projection of at least a part of the first image corresponding to the second image, from the first projection to the second projection, to generate a third image in the second projection; extract a plurality of feature points, respectively, from the second image and the third image; determine a corresponding area in the third image that corresponds to the second image, based on the plurality of feature points respectively extracted from the second image and the third image; transform projection of a plurality of points in the corresponding area of the third image, from the second projection to the first projection, to obtain location information indicating locations of the plurality of points in the first projection in the first image; and store, in a memory, the location information indicating the locations of the plurality of points in the first projection in the first image, in association with the plurality of points in the second projection in the second image.

In one example, the circuitry further generates correction information to be used for correcting at least one of a brightness and a color of each one of the plurality of points in the corresponding area in the third image, with respect to a brightness and a color of each one of the plurality of points in the second image.

In one example, the circuitry further converts a shape of the corresponding area in the third image so as to match a shape of the second image. The correction information is generated from the brightness and the color of each one of the plurality of points in the second image, corresponding to each one of the plurality of points in the corresponding area having the converted shape.

In one example, the plurality of points in the second image is a plurality of grids that are obtained by dividing the second image into a plurality of grid areas.

In one example, the part of the first image corresponding to the second image is an area of the first image that contains a target object of the second image and surroundings of the target object of the second image, and the third image is an image that contains the part of the first image.

In one example, the circuitry extracts, from the third image, a rectangular area corresponding to the second image, based on similarity between the plurality of feature points in the second image and the plurality of feature points in the third image.

In one example, the circuitry further extracts a plurality of feature points from the first image, and determines the part of the first image corresponding to the second image, based on the plurality of features points in the first image and the plurality of feature points in the second image.

This patent application is based on and claims priority pursuant to 35 U.S.C. § 119(a) to Japanese Patent Application Nos. 2016-256560, filed on Dec. 28, 2016, 2017-192011, filed on Sep. 29, 2017, and 2017-245510, filed on Dec. 21, 2017, in the Japan Patent Office, the entire disclosure of which is hereby incorporated by reference herein.

REFERENCE SIGNS LIST 1 special-purpose image capturing device (example of first image capturing device)
3 general-purpose image capturing device (example of second image capturing device)
5 smart phone (example of image processing apparatus)
7 image processing server (example of image processing apparatus)
51 far-distance communication unit
52 acceptance unit
55a metadata generator
55b superimposing unit
56 display control
58 near-distance communication unit
59 storing and reading unit (example of obtainer)

72 acceptance unit
75 image and audio processing unit
75a metadata generator
75b superimposing unit
76 display control
78 near-distance communication unit
79 storing and reading unit (example of obtainer)
517 display
550 extractor
552 first area calculator
554 point of gaze specifier
556 projection converter
558 second area calculator
560 area divider
562 projection reverse converter
564 shape converter
566 correction parameter generator
570 superimposed display metadata generator
582 attribute area generator
584 correction unit
586 image generator
588 image superimposing unit
590 projection converter
750 extractor
752 first area calculator
754 point of gaze specifier
756 projection converter
758 second area calculator
760 area divider
762 projection reverse converter
764 shape converter
766 correction parameter generator
770 superimposed display metadata generator
782 attribute area generator
784 correction unit
786 image generator
788 image superimposing unit
790 projection converter
5000 memory
5001 linked image capturing device DB
7000 memory

The invention claimed is:

1. An image processing apparatus, comprising:
   circuitry configured to
      obtain a first image in a first projection, and a second image in a second projection;
      transform at least a part of the first image corresponding to the second image, from the first projection to the second projection, to generate a third image in the second projection;
      extract a plurality of feature points, respectively, from the second image and the third image;
      determine a corresponding area in the third image that corresponds to the second image, based on the plurality of feature points respectively extracted from the second image and the third image;
      transform a plurality of points in the corresponding area of the third image, from the second projection to the first projection, to obtain location information indicating locations of the plurality of points in the first projection in the first image; and
      store, in a memory, the location information indicating the locations of the plurality of points in the first projection in the first image, in association with the plurality of points in the second projection in the second image.

2. The image processing apparatus of claim 1, wherein circuitry is further configured to generate correction information to be used for correcting at least one of a brightness and a color of each one of the plurality of points in the corresponding area in the third image, with respect to a brightness and a color of each one of the plurality of points in the second image.

3. The image processing apparatus of claim 2,
   wherein the circuitry is further configured to convert a shape of the corresponding area in the third image so as to match a shape of the second image, and
   wherein the correction information is generated from the brightness and the color of each one of the plurality of points in the second image, corresponding to each one of the plurality of points in the corresponding area having the converted shape.

4. The image processing apparatus of claim 1, wherein the plurality of points in the second image correspond to plurality of grids that are obtained by dividing the second image into a plurality of grid areas.

5. The image processing apparatus of claim 1,
   wherein the part of the first image corresponding to the second image is an area of the first image that contains a target object of the second image and surroundings of the target object of the second image, and
   wherein the third image is an image that contains the part of the first image.

6. The image processing apparatus of claim 5, wherein the circuitry is further configured to extract, from the third image, a rectangular area corresponding to the second image, based on similarity between the plurality of feature points in the second image and the plurality of feature points in the third image.

7. The image processing apparatus of claim 5, wherein the circuitry is further configured to:
   extract a plurality of feature points from the first image, and
   determine the part of the first image corresponding to the second image, based on the plurality of features points in the first image and the plurality of feature points in the second image.

8. The image processing apparatus according to claim 1, wherein the first image is a spherical image and the second image is a planar image.

9. The image processing apparatus according to claim 1, wherein the first projection is an equirectangular projection, and the second projection is a perspective projection.

10. The image processing apparatus according to claim 1, wherein the image processing apparatus is at least one of a smart phone, a tablet personal computer, a notebook computer, a desktop computer, and a server computer.

11. An image capturing system, comprising:
    the image processing apparatus claim 1;
    a first image capturing device configured to capture a target object and surroundings of the target object to obtain the first image in the first projection, and transmit the first image in the first projection to the image processing apparatus; and
    a second image capturing device configured to capture the target object to obtain the second image in the second projection, and transmit the second image in the second projection to the image processing apparatus.

12. The image capturing system of claim 11, wherein the first image capturing device is a camera configured to capture the target object to generate a spherical image as the first image.

13. An image processing method, comprising:
- obtaining a first image in a first projection, and a second image in a second projection;
- transforming at least a part of the first image corresponding to the second image, from the first projection to the second projection, to generate a third image in the second projection;
- extracting a plurality of feature points, respectively, from the second image and the third image;
- determining a corresponding area in the third image that corresponds to the second image, based on the plurality of feature points respectively extracted from the second image and the third image;
- transforming a plurality of points in the corresponding area of the third image, from the second projection to the first projection, to obtain location information indicating locations of the plurality of points in the first projection in the first image; and
- storing, in a memory, the location information indicating the locations of the plurality of points in the first projection in the first image, in association with the plurality of points in the second projection in the second image.

14. The image processing method of claim 13, further comprising:
- generating correction information to be used for correcting at least one of a brightness and a color of each one of the plurality of points in the corresponding area in the third image, with respect to a brightness and a color of each one of the plurality of points in the second image.

15. A non-transitory recording medium storing computer-readable code for controlling a computer system to carry out an image processing method, the method comprising:
- obtaining a first image in a first projection, and a second image in a second projection;
- transforming at least a part of the first image corresponding to the second image, from the first projection to the second projection, to generate a third image in the second projection;
- extracting a plurality of feature points, respectively, from the second image and the third image;
- determining a corresponding area in the third image that corresponds to the second image, based on the plurality of feature points respectively extracted from the second image and the third image;
- transforming a plurality of points in the corresponding area of the third image, from the second projection to the first projection, to obtain location information indicating locations of the plurality of points in the first projection in the first image; and
- storing, in a memory, the location information indicating the locations of the plurality of points in the first projection in the first image, in association with the plurality of points in the second projection in the second image.

* * * * *